United States Patent

Tsukamoto et al.

[11] Patent Number: 5,951,433
[45] Date of Patent: Sep. 14, 1999

[54] AUTOMATIC TRANSMISSION

[75] Inventors: Kazumasa Tsukamoto; Masahiro Hayabuchi; Mitsutaka Ito; Takuya Ogino; Akitoshi Kato; Tokuyuki Takahashi; Masafumi Kinoshita, all of Anjo, Japan

[73] Assignee: Aisin AW Co., Ltd., Japan

[21] Appl. No.: 08/980,621

[22] Filed: Dec. 1, 1997

[30] Foreign Application Priority Data

Dec. 5, 1996 [JP] Japan .................................. 8-325283

[51] Int. Cl.⁶ .................................................. F16H 3/44
[52] U.S. Cl. .......................... 475/281; 475/269; 475/900
[58] Field of Search ................................ 475/269, 275, 475/281, 900

[56] References Cited

U.S. PATENT DOCUMENTS

| | | | |
|---|---|---|---|
| 4,304,153 | 12/1981 | Moroto et al. | 475/281 X |
| 4,676,123 | 6/1987 | Kubo et al. | 475/900 X |
| 5,131,902 | 7/1992 | Pierce | 475/281 |
| 5,478,291 | 12/1995 | Morisawa et al. | 475/281 X |
| 5,525,117 | 6/1996 | Morisawa et al. | 475/281 |
| 5,700,223 | 12/1997 | Park et al. | 475/281 X |
| 5,769,749 | 6/1998 | Funahashi et al. | 475/281 X |

FOREIGN PATENT DOCUMENTS

| | | | |
|---|---|---|---|
| 62-88851 | 4/1987 | Japan | 475/281 |
| 2031075 | 4/1980 | United Kingdom | 475/281 |

*Primary Examiner*—Charles A. Marmor
*Assistant Examiner*—Ha Ho
*Attorney, Agent, or Firm*—Lorusso & Loud

[57] ABSTRACT

In an automatic transmission, a small-capacity second clutch that does not engage for reverse drive is mounted forward of a counter drive gear, and the other engaging elements of relatively larger capacity, that is, first and third clutches and first to third brakes, are disposed rearward of the counter drive gear, so that an axially extending space is formed between the counter drive gear and the second clutch, which space is utilized to accommodate a parking gear. Such an arrangement of engaging elements allows the counter shaft to be placed closer to the input shaft without the parking gear interfering with the second clutch, thereby enabling a more compact automatic transmission. Furthermore, since there is no need to relocate the counter drive gear rearward, the length of the counter shaft can be reduced, thereby enabling still greater compactness.

17 Claims, 14 Drawing Sheets

|   |   | Clutch | | | Brake | | | One-way Clutch | |
|---|---|---|---|---|---|---|---|---|---|
|   |   | C1 | C2 | C3 | B1 | B2 | B3 | F1 | F2 |
| P |   | × | × | × | × | × | × | × | × |
| R |   | × | × | ○ | × | × | ○ | × | × |
| N |   | × | × | × | × | × | × | × | × |
| D | 1ST | ○ | × | × | × | × | × | × | ○ |
| D | 2ND | ○ | × | × | × | ○ | × | ○ | × |
| D | 3RD | ○ | ○ | × | × | ○ | × | × | × |
| D | 4TH | × | ○ | × | ○ | ○ | × | × | × |
| 2 | 1ST | ○ | × | × | × | × | × | × | ○ |
| 2 | 2ND | ○ | × | × | ○ | ○ | × | ○ | × |
| 2 | 3RD | ○ | ○ | × | × | ○ | × | × | × |
| L | 1ST | ○ | × | × | × | × | ○ | × | ○ |
| L | 2ND | ○ | × | × | ○ | ○ | × | ○ | × |
| L | (3RD) | ○ | ○ | × | × | ○ | × | × | × |

FIG. 3

|  | C-1 | C-2 | C-3 | B-1 | B-2 |
|---|---|---|---|---|---|
| 1st Speed | ○ |  |  |  | ○ |
| 2nd Speed | ○ |  |  | ○ |  |
| 3rd Speed | ○ | ○ |  |  |  |
| 4th Speed |  | ○ |  | ○ |  |
| 5th Speed |  | ○ |  |  | ○ |
| Reverse |  |  | ○ |  | ○ |
FIG. 10(a)
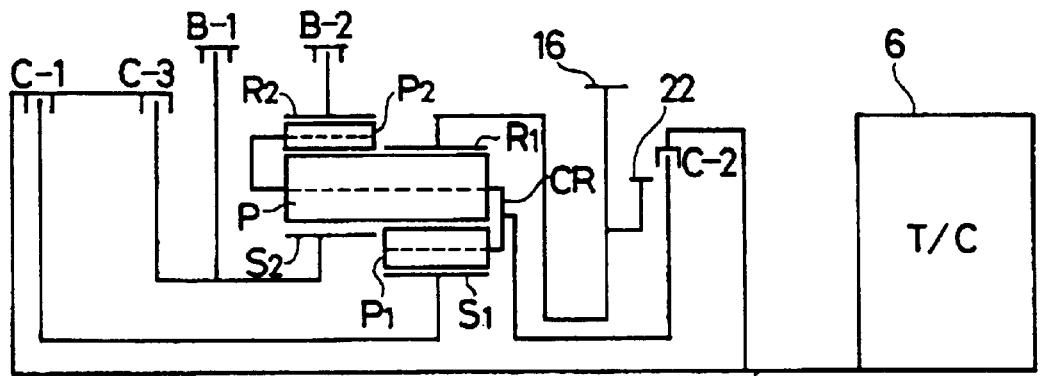
FIG. 10(b)
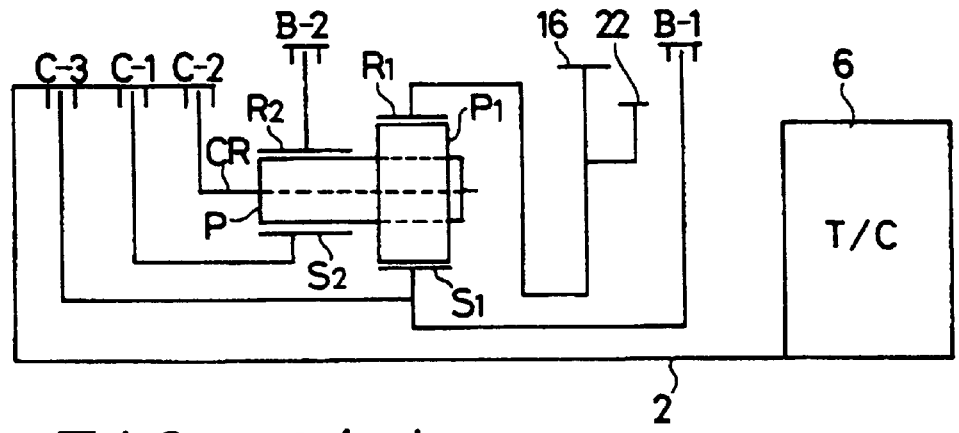
FIG. 10(c)

|  | C-1 | C-2 | B-1 | B-2 | B-3 |
|---|---|---|---|---|---|
| 1st Speed | O |  |  | O |  |
| 2nd Speed |  | O |  | O |  |
| 3rd Speed | O | O |  |  |  |
| 4th Speed |  | O | O |  |  |
| 5th Speed | O |  | O |  |  |
| Reverse | O |  |  |  | O |

FIG. 13

|  |  | Clutch | | | | Brake | | One-way Clutch | |
|---|---|---|---|---|---|---|---|---|---|
|  |  | C0 | C1 | C2 | C3 | B1 | B2 | F0 | F1 |
| P |  | × | × | × | × | × | × | × | × |
| R |  | × | × | ○ | × | × | (○) | × | × |
| N |  | × | × | × | × | × | × | × | × |
| D | 1ST | × | ○ | × | × | × | × | ○ | ○ |
|  | 2ND | × | ○ | × | × | ○ | × | ○ | × |
|  | 3RD | ○ | ○ | × | ○ | ○ | × | ○ | × |
|  | 4TH | ○ | ○ | × | × | ○ | × | × | × |

( ) : At Predetermined Speed or Lower

AUTOMATIC TRANSMISSION

The entire disclosure of Japanese Patent Application No. Hei 8-325283 filed on Dec. 5, 1996 including the specification, drawings and abstract is incorporated herein by reference in its entirety.

BACKGROUND OF THE INVENTION

1. Field of the invention

The present invention relates to an automatic transmission which is installed in, for example, a front-engine front-drive vehicle and which changes the input speed received through a first shaft, through operation of an automatic speed change gear mechanism having a planetary gear unit and engaging elements, and outputs the changed speed through an output gear located in a central portion of the automatic speed change gear mechanism and through a second shaft to a differential mechanism. More particularly, the present invention relates to an automatic transmission wherein the inter-shaft distance and the axial length of the second shaft are reduced to provide a more compact transmission and to facilitate installation in a vehicle.

2. Description of the Related Art

Various automatic transmissions have been developed for vehicles in which an automatic speed change gear mechanism includes a planetary gear unit having a plurality of rotary elements and further includes a plurality of frictional engagement elements, i.e. clutches and brakes, for selectively engaging the rotary elements. Speed change control is by controlling engagement and disengagement of the frictional engagement elements to, in turn, control rotation of the elements of the planetary gear unit.

An example of such a conventional automatic transmission is disclosed in U.S. Pat. No. 5,224,904, wherein the input speed, i.e. speed of a first shaft, is changed by an automatic speed change gear mechanism having a planetary gear unit and frictional engagement elements. The output is extracted at an output gear located substantially central to the first shaft, and transmitted by a second shaft f to a third shaft of a differential device.

FIG. 12 is a skeletal diagram schematically illustrating an automatic transmission A disclosed in the aforementioned U.S. Pat. No. 5,224,904.

In the automatic transmission A illustrated in FIG. 12, when one of the P, R, N and D ranges is selected using a manual shift valve (not shown), clutches C0–C3, brakes B1–B2 and one-way clutches F0–F1 of an automatic speed change gear mechanism a become engaged or disengaged, as shown in FIG. 13, responsive to a combination of on-off signals from various solenoid valves in a hydraulic control circuit (not shown), corresponding to the selected and set range. Rotation of the rotary elements of a planetary gear unit b, such as a sun gear, a ring gear, pinion gears, a carrier and the like, is thereby controlled so that the engine drive force input to a first shaft (input shaft) d, through a torque converter c, is changed in speed. The speed-changed rotation is output from a counter drive gear e disposed in a central portion of the automatic transmission A. In FIG. 13, 0 indicates engagement and X indicates disengagement.

The output from the counter drive gear e is transmitted to a counter driven gear g on a second shaft f, and transmitted from the second shaft f to a third shaft of a differential device h, that is, to the right and left differential shafts i, j.

Recently, the demand has grown for a more compact automatic transmission and improved ease of vehicle installation. The engine compartment of a motor vehicle provides a limited, relatively small space, in which an engine and various other devices and components are mounted along with the automatic transmission. Therefore, even a slight size reduction of an automatic transmission is now of great significance.

The automatic transmission A disclosed in the aforementioned U.S. Pat. No. 5,224,904 employs a design as described below to enable size reduction. As specifically shown in FIG. 14, a parking gear k mounted forward (right side in FIG. 14) of the counter driven gear g on the second shaft f is positioned radially outward of the outer peripheries of a clutch C2 and a brake B1 which are mounted on the first shaft d at the engine side, that is, forward of the counter drive gear e of the automatic speed change gear mechanism a, and parking gear k axially overlaps the clutch C2 and the brake B1. By disposing the counter drive gear e in substantially the center of the automatic speed change gear mechanism a in this manner, a further reduction of the axial length of the second shaft f carrying the counter driven gear g, which engages the counter driving gear e, is achieved.

Furthermore, by disposing the clutch C2 and the brake B1 at the engine side of the counter drive gear e, i.e. on an engine-side portion of the first shaft d, the space m defined between the engine side of the counter drive gear e and a torque converter (T/C) 6, is effectively used.

With such an arrangement of the parking gear k, the clutch C2 and the brake B1, the axial dimensions of the first shaft d and the second shaft f can be reduced, and the size of the automatic transmission A correspondingly reduced.

However there is intense demand for a further size reduction of automatic transmissions, even for the "compact" transmissions, such as the aforementioned automatic transmission A. For a further size reduction of the automatic transmission A, it is conceivable to reduce the inter-shaft distance between the first shaft d and the second shaft f. However, such relocation of the second shaft f closer to the first shaft d will result in interference of the parking gear k with the clutch C2 and with the brake B1 because of the design in which the parking shaft k on the second shaft f is disposed under the clutch C2 and the brake B1 on the first shaft d, that is, the parking gear k axially overlaps the clutch C2 and the brake B1. Further, the spacing between the first shaft d and the second shaft f must be at least the sum of the radius of the brake B1 and the radius of the parking gear k, while, as a practical matter, minimum radii of the clutch C2, the brake B1 and the parking gear k are fixed. Therefore, there is a limitation on the extent to which the second shaft f may be relocated closer to the first shaft d and that limitation is the sum of the radius of the brake B1 and the radius of the parking gear k. Thus, it is almost impossible to further reduce the inter-shaft distance between the first shaft d and the second shaft f.

To avoid interference of the parking gear k with the clutch C2 and the brake B1, the parking gear k can be disposed in the axial space between the counter drive gear e and the clutch C2 by simply by relocating the counter driving gear e, the frictional engagement elements other than the clutch C2 and the brake B1, and the planetary gear unit b axially rearward. It thereby becomes possible to dispose the second shaft f considerably closer to the first shaft d. However, such a modification would require an increase in the lengths of the first shaft d and the second shaft f in the axial direction, and therefore would fail to reduce the overall size of the automatic transmission A, despite a reduction in the inter-shaft distance between the first shaft d and the second shaft f.

Moreover, reverse clutch C2 which engages for reverse driving, requires a relatively large capacity and a relatively great length in the axial direction. Therefore, if the parking gear k is disposed in an axially extending space formed between the counter drive gear e and the clutch C2 as described above, the counter drive gear e must be moved further rearward. Since the counter driven gear g which meshes with the counter drive gear e must be disposed a corresponding distance rearward, the second shaft f must be further elongated.

For the foregoing reason, the automatic transmission A disclosed in the aforementioned U.S. patent cannot be said to fully meet the demand for size reduction in an automatic transmission.

SUMMARY OF THE INVENTION

Accordingly, it is an object of the present invention to provide an automatic transmission that has further reduced weight and size and ease of vehicle installation by reducing the axial length of the second shaft to a minimum and reducing the distance between the first shaft and the second shaft to the extent possible.

To achieve the foregoing objective, the present invention provides an automatic transmission including a first shaft to which drive force from the engine is input and an automatic speed change gear mechanism which has a planetary gear unit having a plurality of rotating elements driven by rotation of the first shaft and a plurality of frictional engagement elements for controlling rotation of the plural rotating elements. The automatic speed change gear mechanism changes the speed of rotation of the first shaft to one of a plurality of gear speeds set by selectively changing engagement of the plurality of engaging elements which control the rotation of the plural rotating elements, and then outputs rotation at the speed thus established through an output member provided at a position substantially central of the first shaft. A second shaft has a driven member which receives the output from the output member. A third shaft is provided with a differential device which receives the output from the output member as transmitted through the second shaft. Among the plurality of engaging elements, at least one engaging element which is disengaged in first gear speed or in reverse is disposed on the forward side (toward the engine) of the output member, and the other engaging elements of the plurality of engaging elements are disposed rearward of the output member. A parking gear is disposed on the first shaft side or the second shaft side so that the parking gear is axially located between the output member and the one (or more) engaging element which is disengaged at first gear speed or in reverse.

In a preferred embodiment of the present invention, the diameter of the parking gear is smaller than the diameter of the output member and smaller than the diameter of the one (or more) engaging element which is disengaged in first gear speed or in reverse.

In another embodiment of the present invention the parking gear is provided on the output member, and the servo piston of the hydraulic servo which operates the aforementioned one engaging element has a boss portion which extends from its inner periphery toward the output member. An opening for supplying operating oil to the hydraulic servo is formed in a portion of the first shaft located between the output member and the one (or more) engaging element and is located adjacent to that portion of the input shaft which slidably supports the boss portion of the servo piston in a liquid-tight manner. In this preferred embodiment, since the parking gear is provided on the output member, an axially extending space is created between the output member and the one engaging element which is disengaged in first gear speed or in reverse. Furthermore, since the boss portion on the servo piston of a hydraulic servo, which operates that one engaging element, extends toward the output member and is slidably fitted on a portion of the first shaft which is located between the output member and the one engaging element, and since the opening for supply of operating oil to the hydraulic servo is formed adjacent to that portion of the input shaft, the aforementioned created space is effectively used and the automatic transmission may be made more compact. Furthermore, since the boss of the servo piston of the hydraulic servo is slidably supported on the first shaft, the diameter of the sliding portion can be reduced and, therefore, the sliding resistance of the servo piston of the hydraulic servo is reduced, so that the engine fuel consumption can be reduced. Further, since the diameter of the seal ring disposed on the sliding portion can also be reduced, the torque loss caused by the slipping that occurs between the first shaft and the boss of the servo piston can also be reduced. Further, since the area of the servo piston is increased, the output of the servo piston is increased, so that the engaging element can be made more compact. At the same time, the hydraulic pressure for operating the servo piston can also be reduced, so that the load on the hydraulic pump can be reduced and, therefore, the drive force consumed by the hydraulic pump can be correspondingly reduced.

In yet another preferred embodiment the automatic transmission of the present invention has a planetary gear unit which includes: a first sun gear; a carrier rotatably supporting a short pinion meshing with the first sun gear and a long pinion meshing with the short pinion; a ring gear meshing with the long pinion; and a second sun gear meshing with the long pinion, the first sun gear being connectable to the first shaft by a first clutch. In this preferred embodiment the carrier is connectable to the first shaft by a second clutch and can be fixed to the case of the automatic transmission by a first engaging means. The ring gear is connected to the output member. The second sun gear is connectable to the first shaft by a third clutch and is selectively engaged with the case by second engaging means; and the second clutch is the engaging element which is disengaged in first gear speed or in reverse. In this embodiment, since the gear train is formed as a Ravigneaux-type gear train, and since the engaging elements are the first to third clutches and the first and second engaging means, and since the second clutch is in the disengaged state during the first gear speed or in reverse and is disposed forward of the output member, it becomes possible to provide a gear train optimal for compact formation and weight reduction.

The aforementioned first engaging means may be a combination of a first one-way clutch enabling the carrier to be fixedly engaged with the case or to rotate in one direction, and a first brake which is disposed substantially in parallel with the first one-way clutch and which selectively engages the first carrier with the case, and wherein the second engaging means comprises a second brake for engaging the second sun gear with the case, a second one-way clutch for engaging the second sun gear with the case during rotation in one direction, and a third brake disposed substantially in series with the second one-way clutch. Since the first engaging means comprises a one-way clutch and a brake disposed substantially in parallel to the one-way clutch, and since the second engaging means comprises a brake, a one-way clutch and another brake disposed substantially in series with the one-way clutch, it becomes possible to provide a compact gear train having good speed shift controllability.

Alternatively, the first sun gear may be connectable to the first shaft by a first clutch and selectively fixed to the case of the automatic transmission by a first brake. In this modification: the carrier is connected to the output member; the ring gear is connectable to the first shaft by a second clutch and is selectively fixed to the case by another engaging means; the second sun gear is connectable to the first shaft by a third clutch; and wherein the first brake is the one engaging element which is disengaged in first gear speed or in reverse.

In yet another embodiment the automatic transmission of the present invention may have a planetary gear unit which includes: a first sun gear; a long pinion meshing with the first sun gear; a ring gear meshing with the long pinion; a second sun gear; and a carrier rotatably supporting a short pinion meshing with the second sun gear and the long pinion meshing with the short pinion. In this construction, the first sun gear is connectable to the first shaft by a first clutch and is selectively fixed to the case of the automatic transmission by a first brake; the carrier is connectable to the first shaft by a second clutch and is selectively fixed to the case by a second brake; the ring gear is connected to the output member; the second sun gear is fixedly engageable with the case by a third brake; and the first brake is the engaging element which is disengaged in the first gear speed or in reverse. This embodiment offers the advantages of reduction in the number of clutches and consequent further compactness.

Yet another embodiment of the automatic transmission of the present invention includes first and second short pinions. In this latter embodiment the planetary gear unit comprises: a first sun gear; a first short pinion meshing with the first sun gear; a long pinion meshing with the first short pinion; a first ring gear meshing with the long pinion; a second sun gear meshing with the long pinion; a second short pinion meshing with the long pinion; a second ring gear meshing with the second short pinion; and a carrier rotatably supporting the first short pinion, the second short pinion and the long pinion. In this construction, the first sun gear is connectable to the first shaft by a first clutch; the carrier is connectable to the first shaft by a second clutch; the first ring gear is connected to the output member; the second sun gear is connectable to the first shaft by a third clutch and selectively fixed to the case of the automatic transmission by first engaging means; the second ring gear is selectively fixed to the case by second engaging means; and the second clutch is the engaging element which is disengaged in the first gear speed or in reverse.

In yet another embodiment, the planetary gear unit comprises: a first sun gear; a short pinion meshing with the first sun gear; a long pinion meshing with the short pinion; a first ring gear meshing with the short pinion; a second sun gear meshing with the long pinion; a second ring gear meshing with the long pinion; and a carrier rotatably supporting the short pinion and the long pinion. In this embodiment, the first sun gear is connectable to the first shaft by a first clutch and is selectively fixed to the case by a brake engaging means; the carrier is connectable to the first shaft by a third clutch; the first ring gear is connected to the output member; the second sun gear is connectable to the first shaft by a third clutch; the second ring gear is selectively fixed to the case of the automatic transmission by fixed engagement means; and the first brake is the engaging element which is disengaged in the first gear speed or in reverse.

Other embodiments of the present invention have a stepped pinion. In such embodiments the planetary gear unit comprises: a stepped pinion having a first pinion portion and a second pinion portion of different diameters; a carrier rotatably supporting the stepped pinion; a first sun gear and a first ring gear which mesh with the first pinion portion; and a second sun gear and a second ring gear which mesh with the second pinion portion. In this construction, the first sun gear is selectively fixed to the case of the automatic transmission by a first brake; the carrier is connectable to the first shaft by a first clutch and is selectively fixed to the case by a second brake; the first ring gear is connected to the output member; the second sun gear is connectable to the first shaft by a second clutch; the second ring gear is fixedly engageable with the case by a third brake; and the first brake is the engaging element which is disengaged in the first gear speed or in reverse. This embodiment offers the advantages of a reduction in the number of clutches and consequent further compactness.

It is also preferable in the present invention that the servo pistons of the hydraulic servos of two clutches disposed rearward of the output member are formed in a double piston construction in which one of the servo pistons is fitted within the other servo for axial sliding movement relative thereto. Because the three clutches are distributed on opposite sides of the output member, that is, one clutch on one side and the other two clutches on the other side, serial arrangement of three clutches in the rearward axial direction is avoided. Further, since the two clutches rearward of the output member are formed in a double piston construction, the layout of the elements of the automatic transmission can be simplified, and a light-weight automatic transmission can be formed with further compactness, i.e. with a reduced length of the first shaft. Alternatively, the servo pistons of hydraulic servos of two brakes disposed rearward of the output member have a double piston construction in which one of the servo pistons is slidably fitted within the other servo piston for axial sliding movement relative thereto. Thus, in this embodiment, one brake is located on one side of the output member and the other two brakes are located on its other side. Therefore, serial arrangement of three brakes in the axial direction rearward of the output shaft is avoided. Further, since the two brakes rearward of the output member are formed of a double piston construction wherein one piston is fitted within the other, the arrangement of the elements of the automatic transmission can be simplified, and a light-weight, compact automatic transmission can be constructed with a reduced length of the first shaft.

In the thus-constructed automatic transmission of the invention, an engaging element that is disengaged state in first speed and in reverse is disposed forward of the output member, and an engaging element that is engaged in first speed or in reverse is not disposed forward of the output member. Since the engaging element disposed forward of the output member is disengaged state in first speed and in reverse, the torque transmitted thereto is small, so that the engaging element can have a small capacity and, therefore, a reduced diameter and axial length. Therefore, an axially-extending space is formed between the output member and the engaging element disposed forward of the output member, which space is utilized to accommodate the parking gear.

Consequently, the second shaft can be located closer to the first shaft without the parking gear interfering with the engaging element disposed forward of the output member. Furthermore, although the parking gear is disposed between the output member and the engaging element disposed forward of the output member, there is no need to relocate a driven member on the second shaft rearward. Therefore, the length of the second shaft can be reduced. Thus, the automatic transmission of the present invention makes it possible to reduce the distance between the first shaft and the second shaft while minimizing the length of the second shaft. Further, since the second shaft is placed closer to the first shaft, the interval between the second shaft and the third shaft can also be reduced. Therefore, the entire automatic transmission can be made more compact.

In particular, if the parking gear is mounted on the first shaft, it leaves sufficient space around the first shaft for installation of a parking mechanism that includes a parking pawl for engaging the parking gear, a mechanism for transmitting operating force to the parking pawl, and the like. Therefore, even with installation of the parking mechanism, it is possible to reduce the size of the case and the inter-shaft distance between the first shaft and the second shaft. Therefore, the aforementioned objective of compactness of the overall automatic transmission can be effectively realized. Furthermore, the valve body containing the control valves inclusive of manual valves for operating and controlling the engaging elements of the automatic transmission, and the like, may be easily accommodated on the front surface (vehicle forward side) or on a lower surface of the automatic transmission.

In the aforementioned preferred embodiment of the present invention wherein the diameter of the parking gear is smaller than the diameter of the output member and smaller than the diameter of the one engaging element which is disengaged in the first gear speed or in reverse, it is possible to increase the space between the output member and the one engaging element disposed forward of the output member, thereby further facilitating installation of the parking pawl.

In those embodiments of the present invention wherein a brake is disposed forward of the output member, provision of a hub extending from the first shaft becomes unnecessary and, therefore, a forward portion of the output member can be more compact.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 3 is a table showing engagement/disengagement of clutches, brakes and one-way clutches of the automatic transmission shown in FIG. 1, in various ranges wherein "o" indicates engagement and "X" indicates disengagement;

FIG. 10(a) is a table of operations of the engaging elements in yet another embodiment of the invention, FIG. 10(b) is a skeletal diagram illustrating an example of one arrangement of the engaging elements for engagement and disengagement according to the table of FIG. 10(a), and FIG. 10(c) is a skeletal diagram illustrating another example of arrangement of the engaging elements for engagement and disengagement according to the table of FIG. 10(a).

FIG. 13 is a table of the operations of various elements of the conventional automatic transmission shown in FIG. 12, in various ranges.

DETAILED DESCRIPTION OF PREFERRED EMBODIMENTS

Preferred embodiments of the present invention will be described hereinafter with reference to the drawings.

Figure 1:
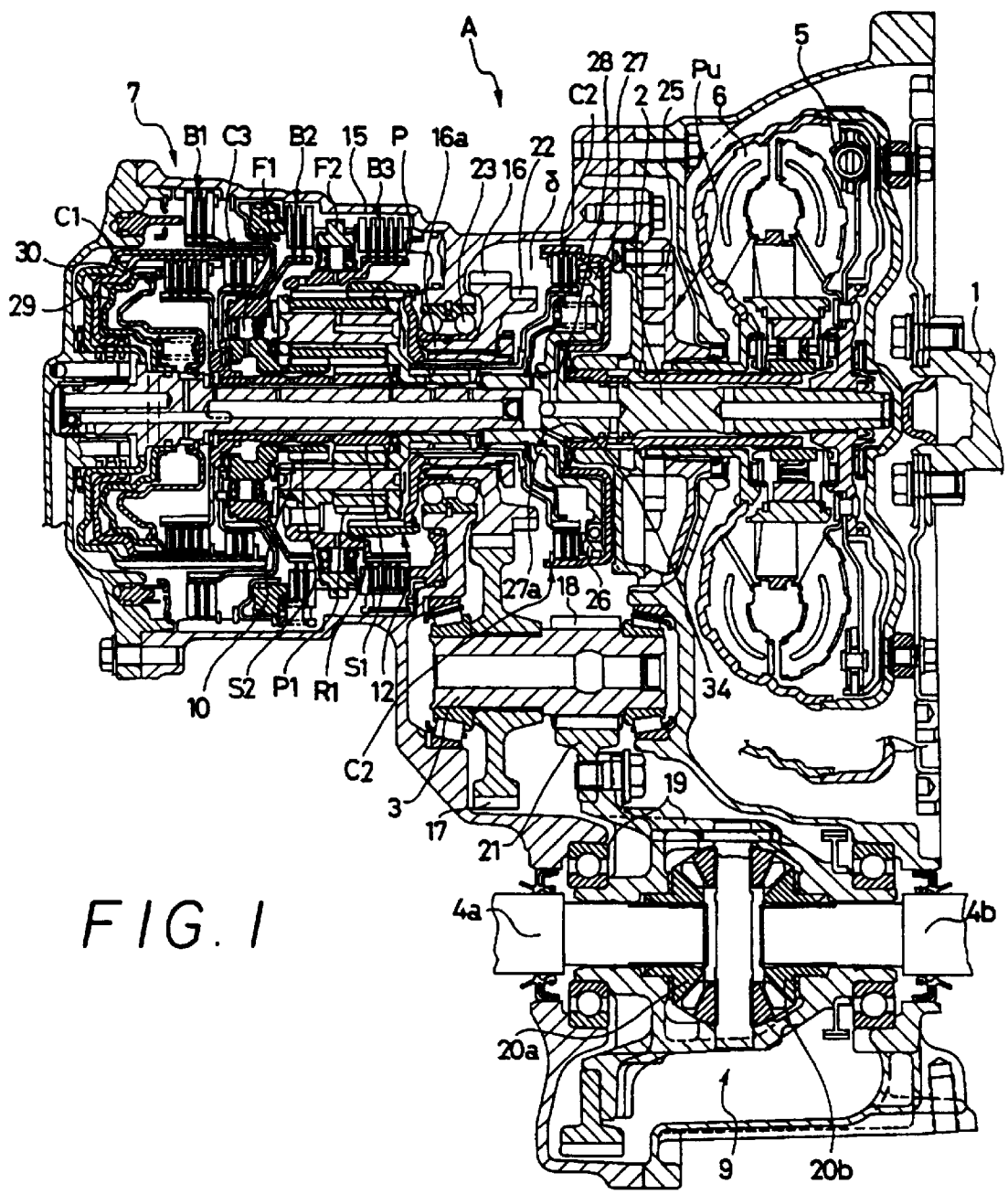
FIG. 1 is a sectional view illustrating an embodiment of the automatic transmission of the present invention.
Figure 2:
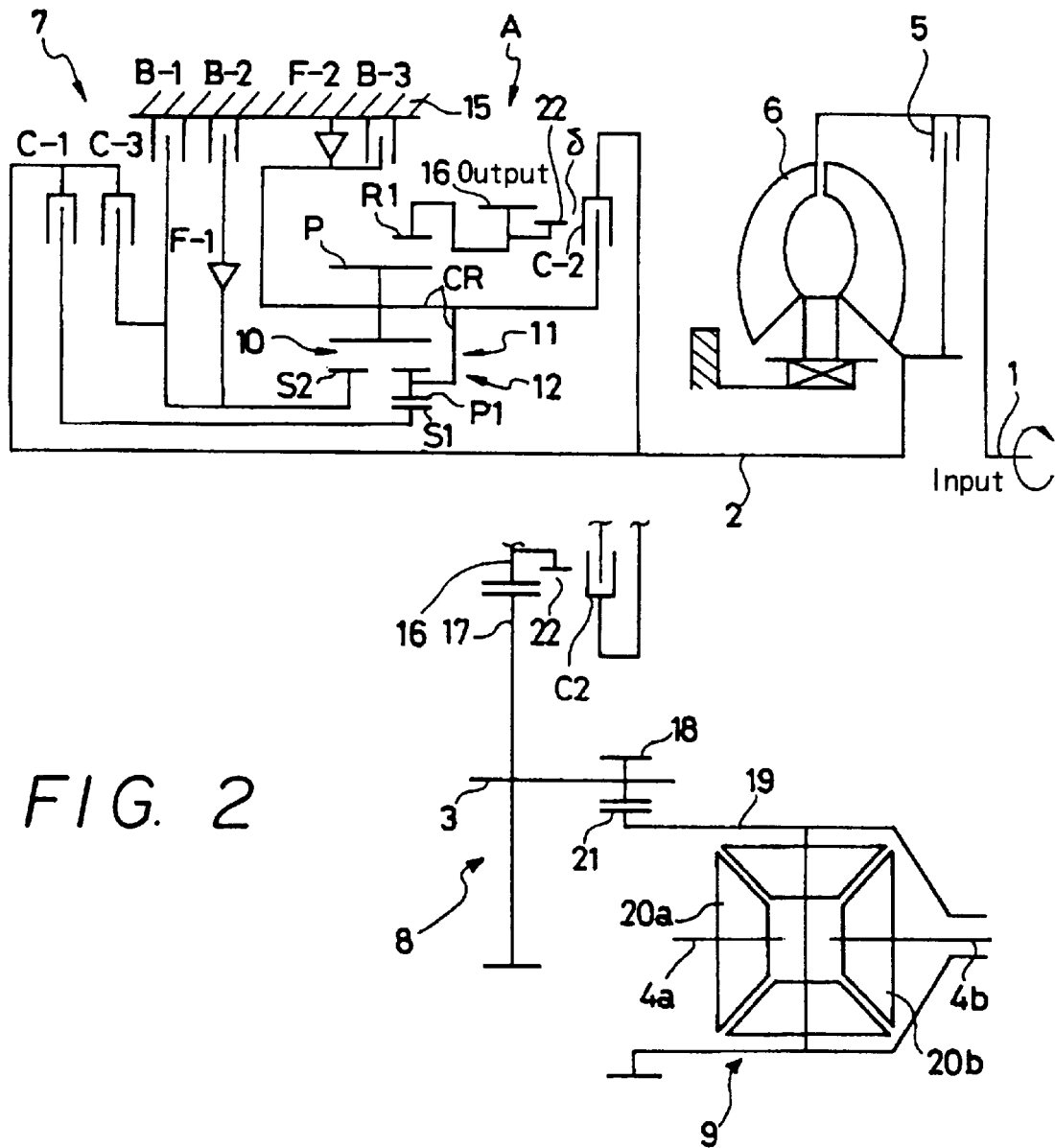
FIG. 2 is a skeletal diagram of the automatic transmission shown in FIG. 1.

FIGS. 1 and 2 illustrate a first embodiment of an automatic transmission A of this invention arranged on three shafts. A first shaft 2 serves as an input shaft and is disposed coaxially with an engine crank shaft 1. A second shaft 3 serves as a counter shaft and a third shaft is formed by axle shafts 4a, 4b. A torque converter 6 has a lockup clutch (L/C) 5 and an automatic speed change gear mechanism 7 which are disposed on the input shaft 2. A counter mechanism 8 is disposed on the counter shaft 3. A differential device 9 is disposed between the axle shafts 4a, 4b.

The automatic speed change gear mechanism 7 includes a planetary gear unit 12 combining a single planetary gear set 10 and a dual planetary gear set 11. A pinion of the single planetary gear set 10, meshing with a second sun gear S2 of the single planetary gear set 10, and a pinion of the dual planetary gear set 11, meshing with a ring gear R1 of the dual planetary gear set 11 and a short pinion P1 of the dual planetary gear set 11, are integrally formed as a common long pinion P. A carrier supporting the long pinion P and the short pinion P1 is integrally formed as a carrier CR common to the two planetary gear sets 10, 11. A first sun gear S1 of the dual planetary gear set 11 is formed integrally with a first hollow shaft 13 rotatably mounted on the outer peripheral surface of the input shaft 2 for rotation relative thereto. The second sun gear S2 of the single planetary gear set 10 is formed integral with a second hollow shaft 14 supported on the outer peripheral surface of the first hollow shaft 13.

The input shaft 2 and the first hollow shaft 13, that is, the first sun gear S1 of the dual planetary gear set 11, are connected by a first (forward) clutch C1. The input shaft 2 and the second hollow shaft 14, that is, the second sun gear S2 of the single planetary gear set 10, are connected by a third (reverse) clutch C3. The second sun gear S2 is selectively fixed to case 15 by a first brake B1, and may also be engaged with the case 15 during rotation in one direction by a second brake B2, via a first one-way clutch F1 disposed substantially in series with the second brake B2.

The carrier CR is connected to the input shaft 2 by a second clutch C2. The carrier CR is selectively engageable with the case 15 by a third brake B3, and also engageable with the case 15 during rotation in one direction, by a one-way clutch F2 disposed substantially in parallel to the third brake B3. The ring gear R1 of the dual planetary gear set 11 is connected to a counter drive gear 16 rotatably supported by the case 15. The counter drive gear 16 forms an output member of the automatic speed change gear mechanism 7.

The counter mechanism 8 includes a counter driven gear 17 that is supported by the counter shaft 3 and meshed with the counter drive gear 16, and a speed reducing gear 18 that is supported by the counter shaft 3 and forms an output member for the counter mechanism 8.

The differential device 9 has a differential carrier 19 that forms a gear mount case, and right and left side gears 20a, 20b. A ring gear 21 is fixed to the differential carrier 19, and meshed with the speed reducing gear 18 of the counter mechanism 8, thereby forming a final speed reducing mechanism. The right and left side gears 20a, 20b are connected to the right and left axle shafts 4a, 4b, respectively.

In the automatic transmission A constructed in this manner, when any of the P, R, N, D, 2nd and L ranges is selected by operation of a manual shift valve (not shown), various clutches C1–C3, brakes B1–B3 and one-way clutches F1–F2 are engaged/disengaged according to the pattern shown in FIG. 3 for the selected range, responsive to a combination of on-off signals from various solenoid valves in a hydraulic control circuit (not shown), thereby selectively establishing the 1st–4th gear speeds in the D range, the 1st–3rd gear speeds in the 2 range, and the 1st–2nd gear speeds in the L range.

Operation of the first embodiment will now be described below.

I. Drive Range (D Range)

For the N-to-D shift, the manual shift valve is moved to the position for the drive range (D range).

For the first gear speed in the D range, the first clutch C1 is engaged and the second one-way clutch F2 is engaged. In this state, rotation of the input shaft 2 is transmitted to the first sun gear S1 by the first clutch C1 and to the short pinion P1. Rotation of the short pinion P1 is transmitted to the long pinion P. At this time, the long pinion P rotates in a forward direction while the second sun gear S2 rotates idly. Although the common carrier CR tends to rotate in a reverse direction due to the rotation of the long pinion P, such reverse rotation of the carrier CR is prevented by the one-way clutch F2 which fixes the carrier CR to the case 15 against reverse rotation. Therefore, the ring gear R1 rotates in a forward direction at a considerably reduced speed. The rotation of the ring gear R1 is extracted from the counter drive gear 16, and transmitted to the counter driven gear 17 of the counter mechanism 8, thereby achieving the first gear speed in the D range.

Further, in the counter mechanism 8, rotation of the counter driven gear 17 is transmitted to the speed reducing gear 18 by the counter shaft 3, and then transmitted by the ring gear 21 to the differential carrier 19 of the differential device 9 at a reduced speed. Finally, rotation of the differential carrier 19 is transmitted to the right and left axle shafts 4a, 4b by the right and left side gears 20a, 20b.

For the second gear speed in the D range, engagement of the first clutch C1 is maintained. Furthermore, the second brake B2 is engaged and the first one-way clutch F1 is engaged. In this state, as in the first gear speed, rotation of the input shaft 2 is transmitted to the long pinion P by the first clutch C1, the first sun gear S1 and the short pinion P1. Although the second sun gear S2 tends to rotate in a reverse direction due to the rotation of the long pinion P, the rotation of the second gear S2 is prevented by the engagement of second brake B2 and engagement of the first one-way clutch F1 against reverse rotation. Therefore, the carrier CR rotates in the forward direction and the ring gear R1 rotates in the forward direction. The rotation of the ring gear R1 is extracted at the counter drive gear 16, thereby achieving the second gear speed.

For the third gear speed in the D range, the engagement of the first clutch C1 and the engagement of the second brake B2 are maintained. Furthermore, the second clutch C2 is engaged. In this state, rotation of the input shaft 2 is not only transmitted to the second sun gear S2 by the first clutch C1, but also transmitted to the carrier CR by the second clutch C2. Therefore, the first sun gear S1 and the carrier CR rotate together in the forward direction, so that both the short pinion P1 and the long pinion P turn together with the carrier CR, the first sun gear S1 and the input shaft 2, but do not individually rotate. In this mode, although the second brake B2 is engaged, the first one-way clutch F1 is not engaged against forward rotation. Therefore, since the long pinion P turns around the input shaft 2 but does not independently rotate, the second sun gear S2 turns together with the long pinion P in the forward direction, and the ring gear R1 also turns together with the long pinion P in the forward direction. That is, the ring gear R1 rotates together with the input shaft 2 in an interlocked manner. The rotation of the ring gear R1 is extracted at the counter drive gear 16, thereby achieving the third gear speed.

For the fourth gear speed in the D range, the engagement of the second clutch C2 and the engagement of the second brake B2 are maintained. Furthermore, the first clutch C1 is released, and the first brake B1 is engaged. In this state, rotation of the input shaft 2 is transmitted to the carrier CR by the second clutch C2. However, since the first sun gear S1 is disconnected from the input shaft 2, rotation of the input shaft 2 is not transmitted to the first sun gear S1. Therefore, the carrier CR rotates together with the input shaft 2. Due to the rotation of the carrier CR, both the long pinion P and the short pinion P1 turn around the input shaft 2. In this transmission, since the first brake B1 is engaged, the second sun gear S2 does not rotate. Further, since the first sun gear S1 is disconnected from the input shaft 2 and, therefore, free, both the long pinion P and the short pinion P1 rotate individually (independently), so that the first sun gear S1 rotates idly. Due to the rotation of the long pinion P around the input shaft 2 and the individual rotation of the long pinion P, the ring gear R1 rotates in the forward direction at a higher speed than the input shaft 2. The rotation of the ring gear R1 is extracted at the counter drive gear 16, thereby achieving the high fourth gear speed, i.e. a speed that exceeds the rotary speed of the input shaft 2.

II. Reverse Range (R Range)

For the N-to-R shift, the manual shift valve is moved to the position for the reverse range (R range).

For the R range, the third clutch C3 is engaged and the third brake B3 is engaged. In this state, the carrier CR is fixed by engagement of the third brake B3. Rotation of the input shaft 2 is transmitted to the second sun gear S2 by the third clutch C3. Due to the rotation of the second sun gear S2, the long pinion P rotates in the reverse direction. Further, since the carrier CR does not rotate, the ring gear R1 rotates in the reverse direction at a reduced speed. The rotation of the ring gear R1 is extracted at the counter drive gear 16.

III. Parking Range (P Range) and Neutral Range (N Range)

The manual shift valve is set to the position for the parking range (P range) or the neutral range (N range).

For the P range or the N range, no clutch, no brake and no one-way clutch is engaged. In this state, rotation of the input shaft 2 is not transmitted to the counter drive gear 16, so that the axle shafts 4a, 4b do not rotate.

IV. Second Range (2 Range)

The manual shift valve is set to the position for the second range (2nd range).

For the first gear speed in the 2nd range, the engagements are all the same as in the first gear speed in the D range described above. That is, the first gear speed in the 2nd range is the same as the first gear speed in the D range. For the second gear speed in the 2nd range, the first brake B1 is engaged, in addition to the engagements for the second gear speed in the D range described above. In this state, the second sun gear S2 is prevented from rotating in both forward and reverse directions, distinguished from the case in the second gear speed in the D range. Thereby, the second gear speed in the 2nd range is achieved. For the third gear speed in the 2nd range, the engagements are the same as in the third gear speed in the D range, described above. That is, the third gear speed in the 2nd range is the same as the third gear speed in the D range.

V. Low Range (L Range)

The manual shift valve is set to the position for the low range (L range).

For the first gear speed in the L range, the third brake B3 is engaged, in addition to the engagement of the elements which are engaged in the first gear speed in the D range, as described above. Thereby, engine braking with a relatively large braking force is effected. For the second gear speed in the L range, the engagements are all the same as in the second gear speed in the 2nd range. That is, the second gear speed in the L range is the same as the second gear speed in the 2nd range, thereby effecting engine braking. The braking force of the engine braking at this time is smaller than that of the engine braking in the first gear speed of the L range. For the third gear speed in the L range, the engagement conditions are all the same as in the third gear speed of the 2nd range. That is, the third gear speed of the L range is the same as the third gear speed in the 2nd range.

In the automatic transmission A of this embodiment, the second clutch C2 is disposed on the engine side (forward side) of the counter drive gear 16, and the other engaging elements, that is, the first and third clutches C1, C3, the first to third brakes B1, B2, B3, and the first and second one-way clutches F1, F2, are disposed rearward of the counter drive gear 16. The second clutch C2 engages for the third gear speed and the fourth gear speed in the D range, and does not engage for any other gear speed, as shown in FIG. 3. In the third gear speed of the D range, where the second clutch C2 engages, the first clutch C1 also engages as well as the second clutch C2, so that torque from the input shaft 2 is distributed between the first clutch C1 and the second clutch C2. In the fourth gear speed in the D range, where the second clutch C2 engages, the torque converter 6 provides almost no amplification of engine output torque, so that the no stall torque is transmitted from the torque converter 6 to the second clutch C2. Therefore, the second clutch C2 does not need to have a large capacity. That is, the axial and diameter dimensions of the second clutch C2 are smaller than the dimensions of the clutches and brakes that engage for the first gear speed or the second gear speed in the D range or for the R range. By disposing the second clutch C2 with reduced dimensions forward of the counter drive gear 16, axially extending space δ is formed between the counter drive gear 16 and the second clutch C2, as can be seen in FIGS. 1 and 2.

In the space 6, the parking gear 22 provided integrally with the counter drive gear 16 is disposed without radially overlapping the second clutch C2. The counter drive gear 16 is rotatably cantilevered to the case 15 at a rear tubular shaft portion 16a of the counter drive gear 16 supported by a bearing 23. Since the parking gear 22 is thus disposed between the counter drive gear 16 and the second clutch C2, the counter shaft 3 can be placed closer to the input shaft 2 without interference of the parking gear 16 with the second clutch C2.

Figure 4:
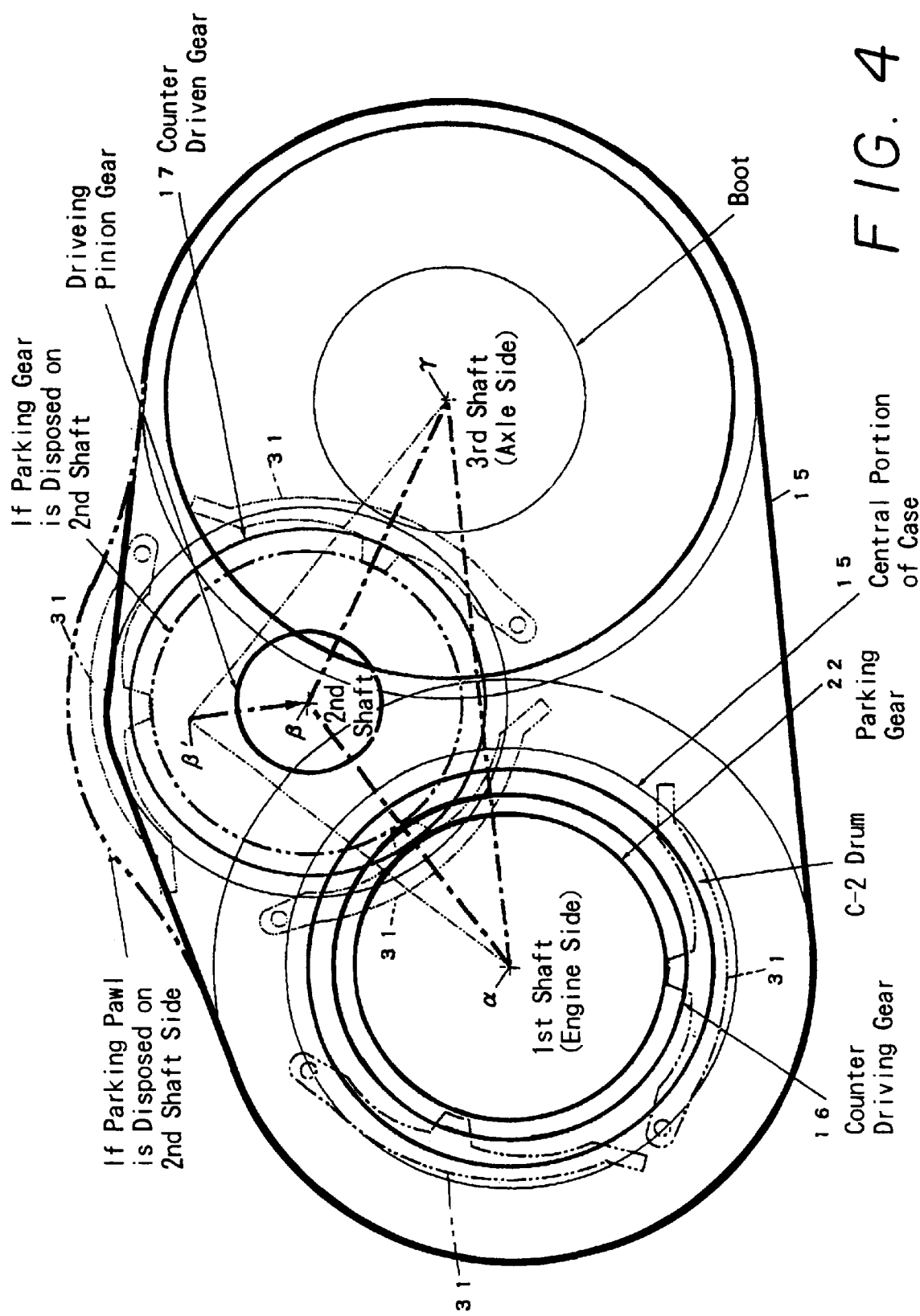
FIG. 4 is an end view illustrating reduction in intershaft distance in the automatic transmission of the present invention.

Referring to FIG. 4, the position β of the second shaft (counter shaft) 3 in this first embodiment is closer to the position α of the first shaft (input shaft) 2 and the position γ of the third shaft (right and left axle shafts 4a, 4b) than is the position β of the second shaft relative to the positions α and γ in the conventional case wherein at least one of the clutches and brakes that engage for the first gear speed, the reverse drive or the like is relatively larger. Therefore, the triangle defined by the three positions α, β, γ of the first to third shafts becomes a flattened triangle in which the position β of the second shaft is lower, while the inter-shaft distance between the position α of the first shaft and the position γ of the third shaft remains unchanged, relative to the conventional transmission, thereby making a compact automatic transmission A.

Figure 5A:
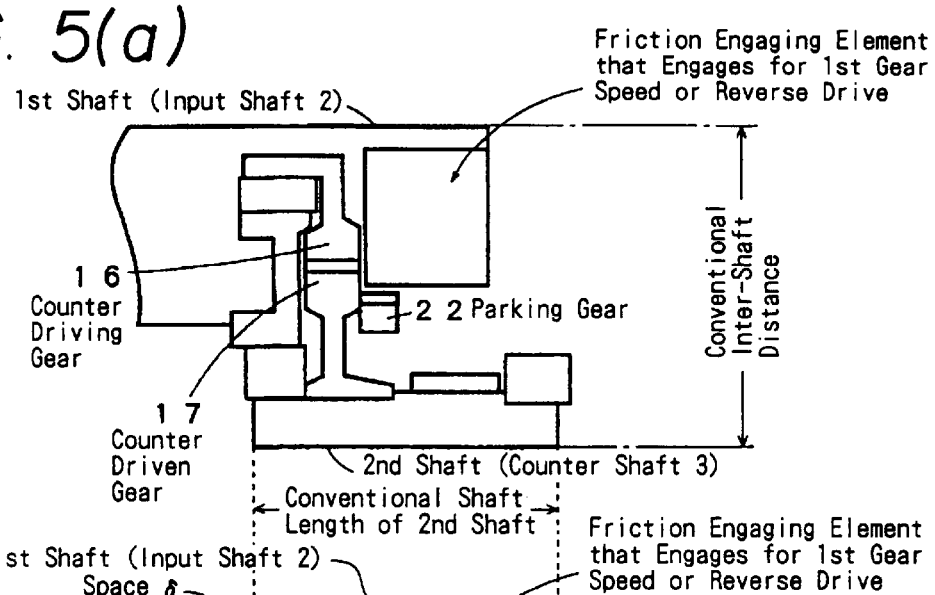
FIGS. 5(a), 5(b) and 5(c) are diagrams illustrating length reduction of a second shaft in the automatic transmission of the present invention.
Figure 5B:
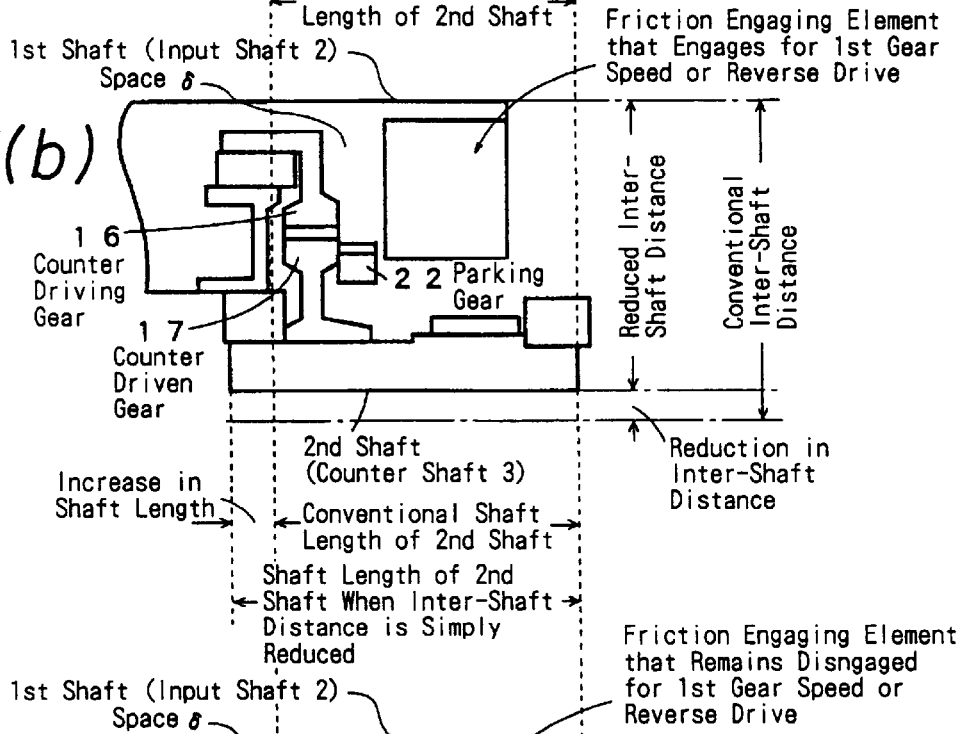

In a conventional automatic transmission as schematically shown in FIG. 5(a) wherein a large-capacity friction engaging element that engages for the first gear speed or reverse is disposed forward of a counter drive gear 16, if the counter drive gear 16 and the friction engaging elements disposed rearward of the counter drive gear 16 are simply moved rearward to form an axially extending space δ between the counter drive gear 16 and the friction engaging elements that engage for the first gear speed or the reverse drive, and if a parking gear 22 is disposed in the space δ as schematically shown in FIG. 5(b), the inter-shaft distance between the first shaft (input shaft 2) and the second shaft (counter shaft 3) is reduced while the shaft length of the second shaft is increased since the counter driven gear 17 meshing with the counter drive gear 16 is also moved rearward.

Figure 5C:
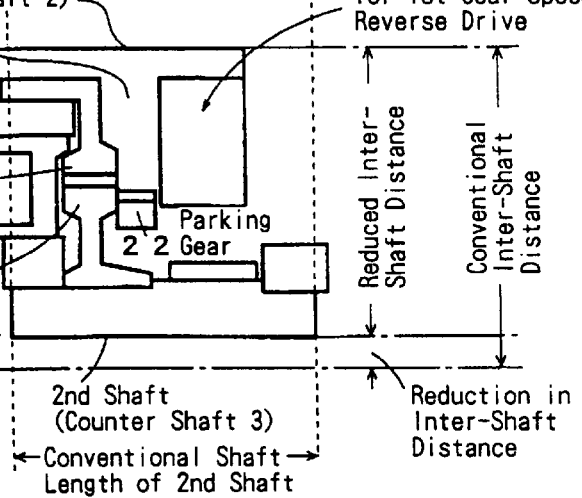

In contrast, in the automatic transmission A of this first embodiment, as shown in FIG. 5(c), a small-capacity friction engaging element that remains disengaged in the first gear speed or reverse is disposed forward of the counter drive gear 16, and the axial dimension of this small-capacity friction engaging element is less than the axial dimension of the large-capacity friction engaging element shown in FIG. 5(b). Therefore, a space δ can be formed between the counter drive gear 16 and the friction engaging element remaining disengaged in first gear speed or reverse without moving the counter drive gear 16 rearward. Since there is no need to relocate the counter driven gear 17 rearward, the shaft length of the second shaft is not increased, that is, it may be the same or less than the shaft length of the second shaft in a conventional automatic transmission.

Furthermore, a pump case 25 of hydraulic pump Pu for supplying operating oil to operate the friction engaging elements is disposed in an end portion of the case 15 of the automatic transmission A near the torque converter 6, as shown in FIG. 1. The pump case 25 is formed of an iron material. However, since the second clutch C2 has radially reduced dimensions, a portion of the case 15 of the automatic transmission A facing the second clutch C2 and an end portion of the case 15 for mounting the pump case 25 can be placed closer to the input shaft 2, thereby allowing a more compact construction. Therefore, since the pump case 25 can also have radially reduced dimensions, the relatively heavy iron pump case 25 can be made more compact, thereby reducing the weight of the pump case 25. The automatic transmission A will thus be effectively reduced in weight.

Further, the space δ between the counter drive gear 16 and the second clutch C2 is effectively used so that a boss portion 27a on the inner peripheral side of the servo piston 27 of a hydraulic servo 26 of the clutch C2 is liquid-tight with and slidably disposed on the input shaft 2. That is, since the parking gear 22 is provided integrally with the counter drive gear 16, a space δ is formed around a portion of the input shaft 2. To use that portion of input shaft 2 to slidably receive the boss portion 27a of the servo piston 27, the boss portion 27a extends rearward, that is, toward the counter drive gear 16. Furthermore, the hub of the second clutch C2 is projected toward the inner peripheral side of the parking gear 22. A supply opening 28 for supplying operating oil to the hydraulic servo 26 is formed adjacent to the sliding portion of the input shaft 2 on which the boss portion 27a of the servo piston 27 slides. The supply opening 28 communicates with the hydraulic pump Pu through a passage 34 formed in the input shaft 2, so that operating oil is supplied by the hydraulic pump Pu through the passage 34 and the supply opening 28 into an oil pressure chamber of the hydraulic servo 26.

Furthermore, the portion of the input shaft 2 on which the boss portion 27a of the servo piston 27 slides is provided with a seal ring 34. The seal ring 34 prevents operating oil supplied to the oil pressure chamber of the hydraulic servo 26 through the supply opening 28 from leaking rearward (at the counter drive gear side).

By effectively using the space δ in this manner, the boss portion 27a of the servo piston 27 can be liquid-tight and slidably disposed on the input shaft 2. Thereby, the boss portion 27a, that is, a sliding portion of the servo piston 27, is reduced in diameter, so that the sliding resistance is reduced. Therefore, the engine fuel consumption can be reduced. Furthermore, since the diameter of the seal ring 34 provided on the input shaft 2 is also reduced, the torque loss caused by slipping that occurs between the input shaft 2 and the boss portion 27a of the servo piston 27 is reduced. Further, as the diameter of the boss portion 27a decreases, the area of the servo piston 27 can be increased, so that the output of the servo piston 27 can be increased. Therefore, the clutch C2 can be further reduced in size. At the same time, the hydraulic pressure for operating the servo piston 27 can also be reduced, so that the load on the hydraulic pump Pu can be reduced and, therefore, the drive force consumed by the hydraulic pump Pu can be correspondingly reduced. Moreover, effective use of the space δ contributes to compactness of the automatic transmission A, as described above.

Furthermore, as shown in FIG. 1, first and third servo pistons 29, 30 of hydraulic servos of the first and third clutches C1, C3 are located rearward of the counter drive gear 16 and are formed in a double piston construction. In this double piston construction first servo piston 29 is formed as a closed end tube and controls engagement and disengagement of the first clutch C1. The first servo piston 29 is fitted into the third servo piston 30 which is similarly formed in a closed end tubular shape and which controls engagement and disengagement of the third clutch C3. Thus, pistons 29 and 30 have a telescoping relationship, i.e. they slide axially relative to each other. By thus forming the first and third servo pistons 29, 30 in a double piston construction, the axial length of the automatic transmission A can be reduced.

In the automatic transmission A of this first embodiment as described above, the small-capacity second clutch C2 is disposed forward of the counter drive gear 16, and the other friction elements with relatively larger capacity, that is, the first and third clutches C1, C3, and the first to third brakes B1–B3, are disposed rearward of the counter drive gear 16, to form the axially extending space δ between the counter drive gear 16 and the second clutch C2. The parking gear 22 is disposed in the space δ. Therefore, the counter shaft 3 can be placed closer to the input shaft 2 without interference of the parking gear 22 with the second clutch C2, thereby enabling a compact formation of the automatic transmission A. Since there is no need to relocate the counter driven gear 17 rearward despite placement of the parking gear 22 between the counter drive gear 16 and the second clutch C2, the shaft length of the counter shaft 3 can be reduced, thereby enabling further compactness of the automatic transmission A.

Furthermore, the clutches are distributed on both sides of the counter drive gear 16, that is, the small-capacity second clutch C2 is disposed forward of the counter drive gear 16, and the other clutches with larger capacity, that is, the first and third clutches C1, C3, are disposed rearward of the counter drive gear 16. Thereby, serial arrangement of the three clutches in the axial direction is avoided. Further, since the pistons 29, 30 of the first and third clutches C1, C3 are formed in a double piston construction, the layout of the elements of the automatic transmission A can be simplified, and the automatic transmission A can be formed with further compactness, i.e. with a reduced length of the first shaft. In a case where, instead of the second clutch C2, the first or second brake B1, B2, for example, is disposed forward of the counter drive gear 16, the other brakes can be disposed rearward of the counter drive gear 16 substantially as the clutches in the foregoing embodiments.

Further, although the counter drive gear 16 is cantilevered at its tubular shaft portion 16a, which extends rearward from the side of the counter drive gear 16 opposite the parking gear 22, the counter drive gear 16 is stably supported by the bearing 23 since the area of meshing engagement between the counter drive gear 16 and the counter driven gear 17 is axially adjacent the bearing 23.

Further, the counter drive gear 16, the second clutch C2 and the parking gear 22 are disposed centrally of the axis of the automatic transmission A. Disposed under or to the side of the central portion of transmission A is the valve body containing various valves, such as electromagnetic valves, manual valves and the like for controlling engagement and disengagement of the individual clutches C1–C3 and the individual brakes B1–B3. Further, the valve body has switches and the like for detecting the range selected by operation of the shift lever. The manual valves, the switches and the like are operated by the force manually applied to the shift lever to select and set a range. This manual force is also used to operate a parking pawl that engages with the parking gear 22. Since the parking gear 22 is disposed between the counter drive gear 16 and the second clutch C2, the operating force transmission mechanism, for transmitting the force applied to the shift lever to the parking pawl, the switches and the manual valves can be simplified, thereby facilitating layout of the parking mechanism.

Figure 6A:
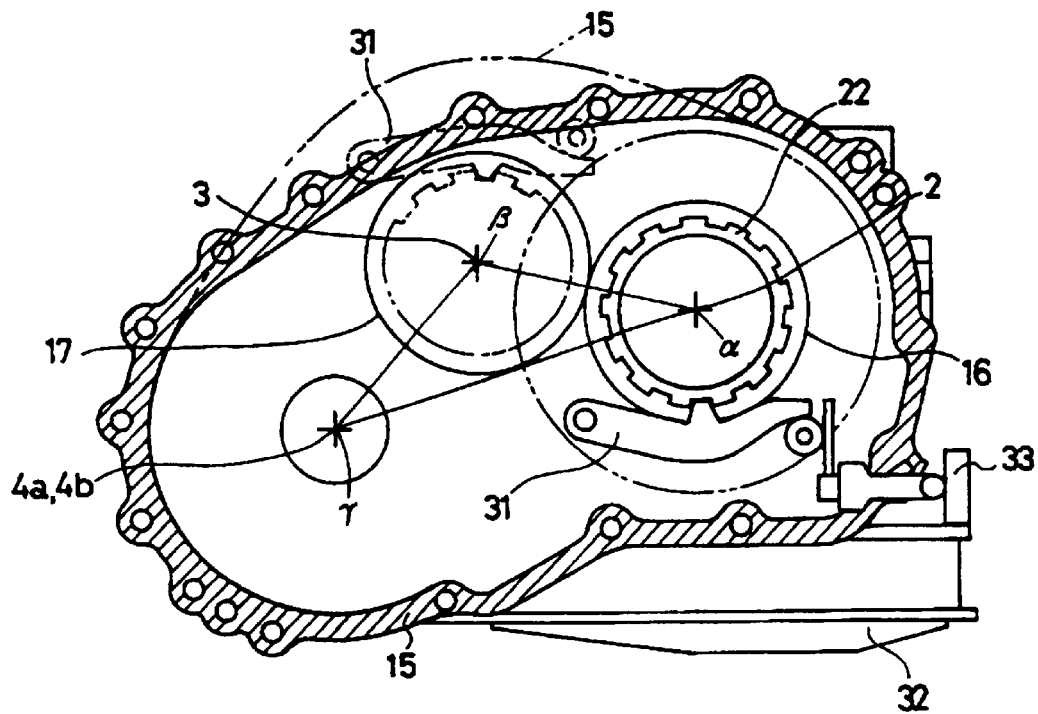
FIG. 6(a) is an axial cross-section illustrating the parking pawl disposed under the parking gear.

Further, since a relatively large space is formed under the first shaft α as indicated FIG. 4 and FIG. 6(a), by disposing the parking gear 22 on the input shaft side of the first shaft, the space can be effectively used for accommodating the parking pawl 31 and, further, mounting of the valve body (V/B) 32 is facilitated. Thus, the case 15 can be made yet more compact by placing the second shaft β closer to the first shaft a even with allowance for the parking pawl 31. Therefore, the compactness of the case 15 achieved by the reducing the distance between the first shaft a and the second shaft β can be fully realized.

In a case, for example, where the parking gear 22 is disposed on the counter shaft 3, it is optimal to dispose the parking pawl 31 above the parking gear 22 as indicated in FIG. 4. For this arrangement, however, it is necessary to considerably expand the case 15 as indicated by the two-dot and dash line, resulting in a failure to fully realize the potential reduction of the dimensions of the case 15 deriving from reduction of the interval between the first shaft a and the second shaft β. In a case where the parking pawl 31 is disposed between the first shaft a and the second shaft β or between the second shaft β and the third shaft γ, as indicated in FIG. 4, it becomes necessary to increase the distance between the first shaft α and the second shaft β or the distance between the second shaft β and the third shaft γ to some extent, to allow for operation of the parking pawl 31. This arrangement will also result in a failure to fully realize the potential compactness of the case 15 achieved by reducing the distance between the first shaft a and the second shaft β. Thus, although the placement of the parking gear 22 on the second shaft β allows some improvement in the compactness of the case by reduction of the distance between the first shaft α and the second shaft β, placement of the parking gear 22 on the first shaft is more desirable since this arrangement enables full realization of the potential for compactness of the case 15.

An N switch 32 is disposed near the valve body 32 on a lower front portion of the automatic transmission A as shown in FIG. 6. When a shift range is selected and set by a shift lever (not shown), the N switch 32 detects the position of shift lever as the set shift range. The parking pawl 31, the manual valves inside the valve body 32, and the N switch 33 are operated and controlled by the operating force on the shift lever. Therefore, by disposing the parking pawl 31 closer to the valve body 32 and the N switch 33, the construction of the mechanism for transmitting operating force from the shift lever to the parking pawl 31 is simplified, thereby facilitating layout of the parking mechanism.

Figure 6B:
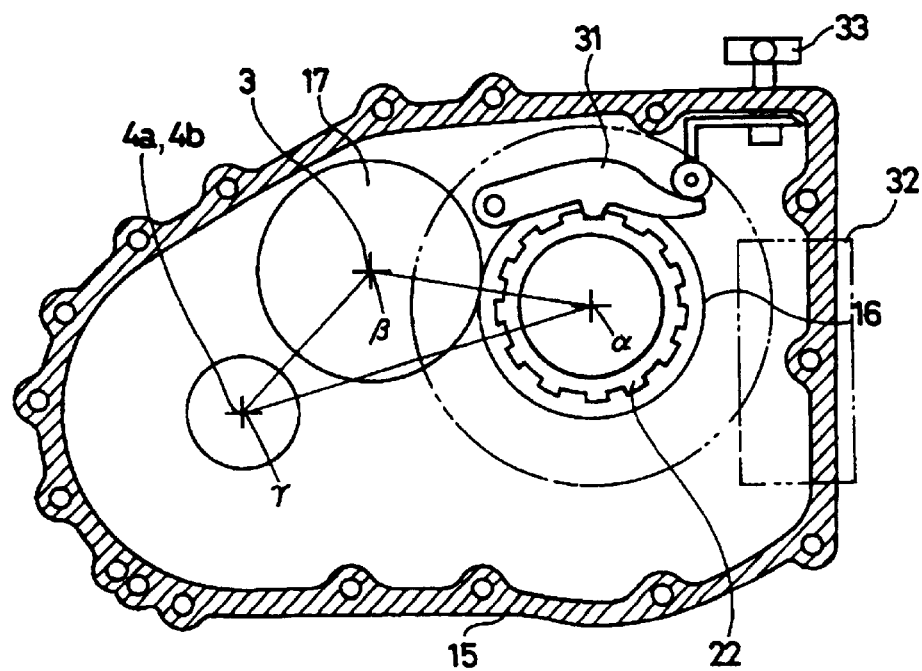
FIG. 6(b) is an axial cross-section illustrating the parking pawl disposed over the parking gear.

Further, in a case where the parking gear 22 is disposed on the first shaft α as shown in FIG. 6(b), a relatively large space is formed at the front side of the automatic transmission A (a vehicle-forward side of the automatic transmission as installed in a vehicle). Therefore, the valve body 32 can be disposed at the front side of the automatic transmission A with a high space efficiency. In this case, it becomes possible to dispose the parking pawl 31 above the parking gear 22. This arrangement also allows easy layout of the parking mechanism and compact construction if the parking pawl 31 is disposed closer to the valve body 32 and the N switch 33.

Figure 7:
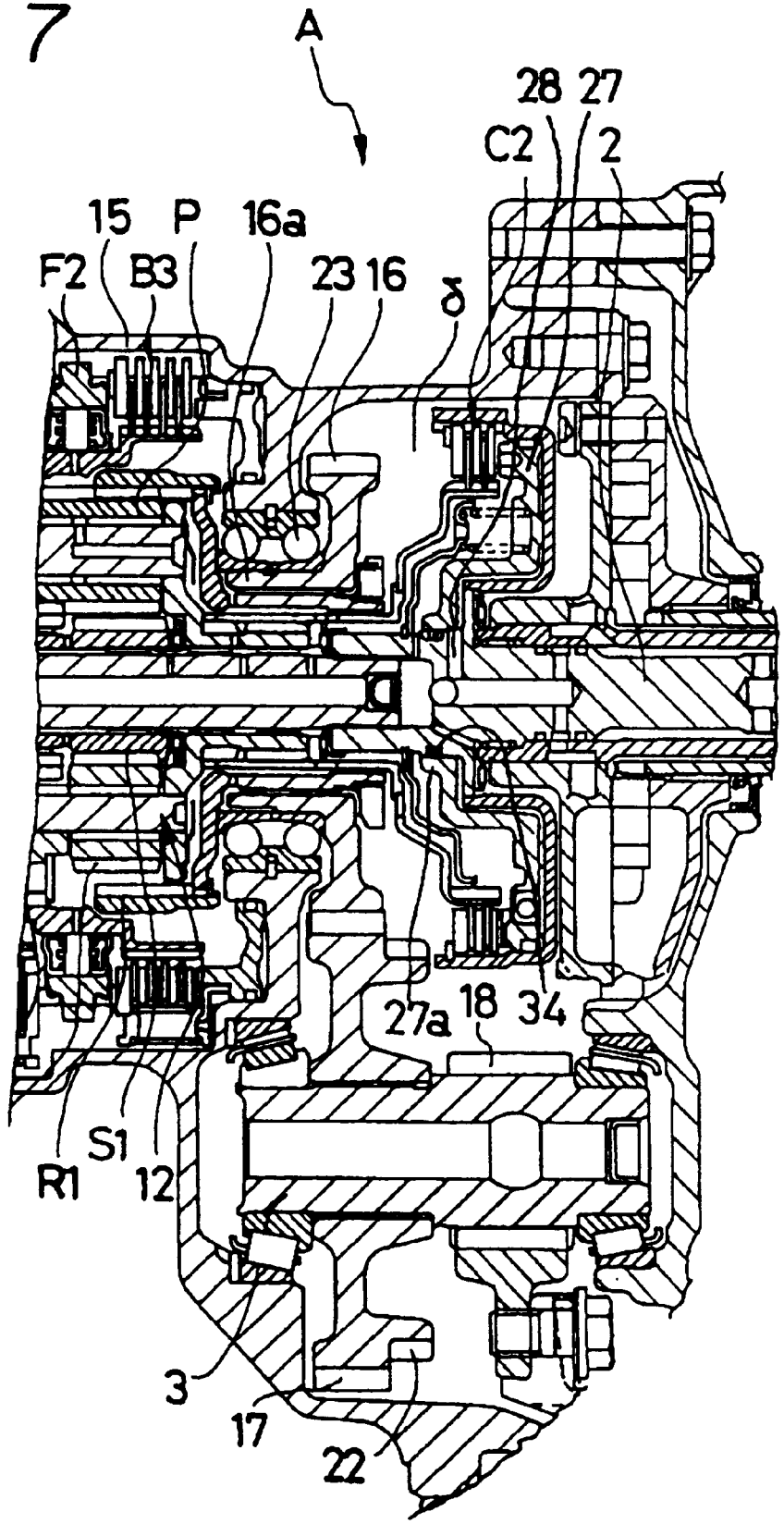
FIG. 7 is a partial cross-section of another embodiment of the automatic transmission of the present invention.

FIG. 7 is a sectional view showing a portion of a second embodiment of the present invention. The elements comparable to those of the foregoing embodiment are indicated by the same reference characters and will not be described in detail again.

While, in the foregoing embodiment, the parking gear 22 is integral with the counter drive gear 16 which is mounted on the input shaft 2, in this second embodiment the parking gear 22 is integral with counter driven gear 17 mounted on counter shaft 3, as shown in FIG. 7. Other components of the automatic transmission A of this second embodiment are substantially the same as in the automatic transmission A of the first embodiment.

As for the operation and advantages of this embodiment, since the parking gear 22 is disposed on the second shaft, the space available for the parking pawl 31 is reduced as indicated in FIGS. 6(a) and 6(b). Therefore, as compared with the first embodiment, it becomes slightly more difficult to accommodate the parking pawl 31 without change to the input shaft 2 or the case 15. Other operations and advantages of this embodiment are substantially the same as those of the first embodiment.

Figures 8A, 8B:
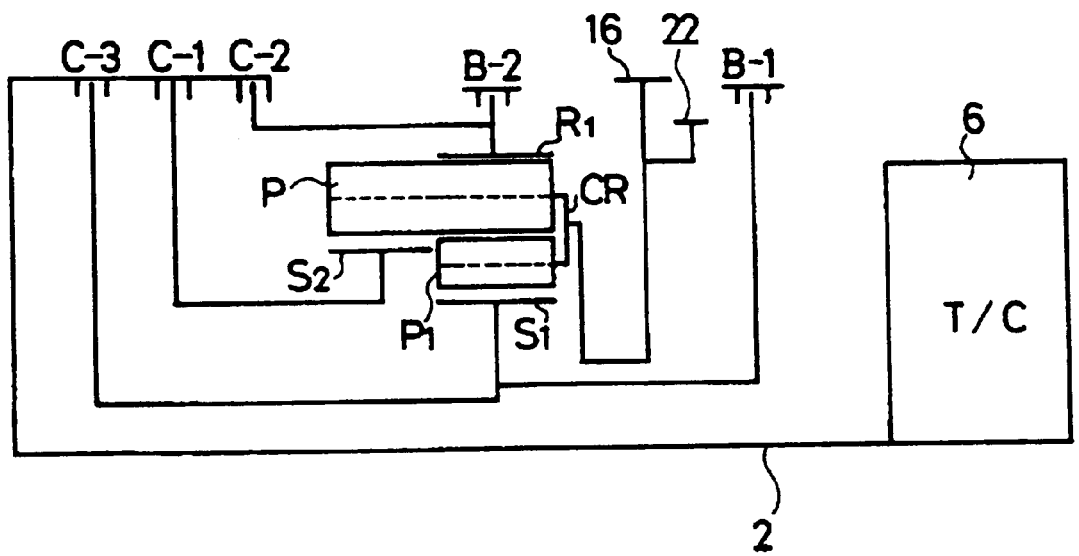
FIG. 8(a) is a table of operations of engaging elements.
FIG. 8(b) is a skeletal diagram illustrating an example of arrangement of the engaging elements for engagement and disengagement according to the table in FIG. 8(a)

FIG. 8(b) shows an automatic speed change gear mechanism of another modification for setting at least a drive range and a reverse range. It is designed to achieve four gear speeds in the drive range. As shown in FIG. 8(b), the automatic speed change gear mechanism has a planetary gear unit which includes four rotating elements: a first sun gear S1, a carrier CR rotatably supporting a short pinion P1 meshing with the first sun gear S1 and a long pinion P meshing with the short pinion P1, a ring gear R1 meshing with the long pinion P, and a second sun gear S2. The elements of the automatic speed change gear mechanism of this third embodiment engage as shown in FIG. 8(a), that is, first clutch C1 engages for the first to third gear speeds, second clutch C2 engages for the third gear speed and the fourth gear speed, third clutch C3 engages for the rear drive, first brake B1 engages for the second gear speed and the fourth gear speed, and second brake B2 engages for the first gear speed and for reverse.

The first sun gear S1 is selectively connected to input shaft 2 through the third clutch C3, and selectively fixed to the case 15 by the first brake B1. The ring gear R1 is selectively connected to the input shaft 2 through the second clutch C2, and selectively fixed to the case 15 by the second brake B2. The second sun gear S2 is selectively connected to the input shaft 2 by the first clutch C1. The carrier CR is connected to a counter drive gear 16.

The first brake B1 is disposed forward of the counter drive gear 16, and a parking gear 22 is disposed between the counter drive gear 16 and the first brake B1. The first to third clutches C1, C2, C3 and the second brake B2 are disposed rearward of the counter drive gear 16. In this gear train, the first brake B1 is the engaging element most appropriately disposed forward of the counter drive gear 16.

Figures 9A, 9B:
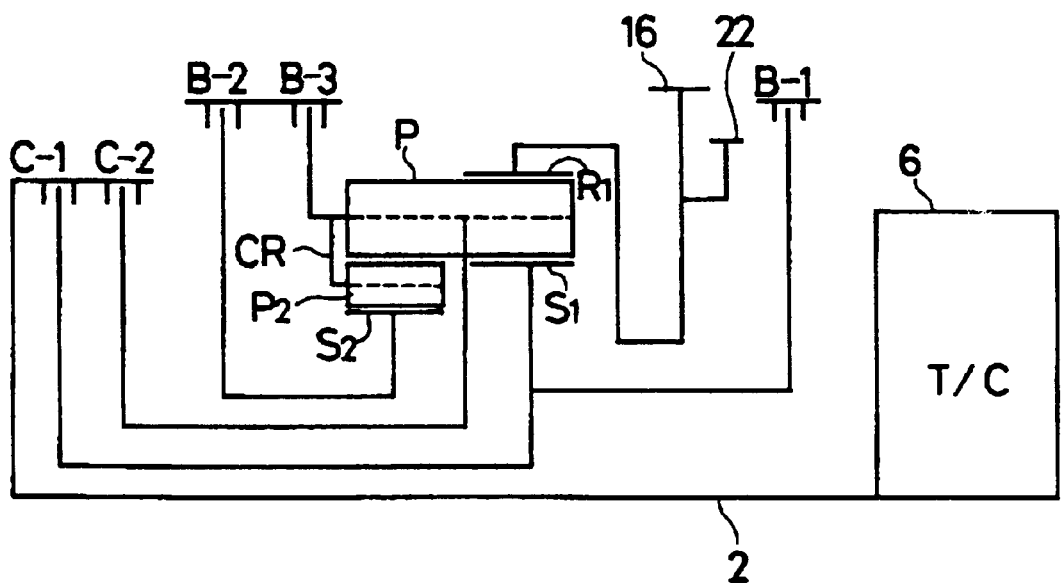
FIG. 9(a) is a table of operations of the engaging elements in another embodiment of the invention.
FIG. 9(b) is a skeletal diagram illustrating an example of arrangement of the engaging elements for engagement and disengagement according to the table in FIG. 9(a)

FIG. 9(a) shows another embodiment of an automatic speed change gear mechanism according to the present invention for establishing at least a drive range and a reverse range. The speed change mechanism of this fourth embodiment is designed to achieve four gear speeds in the drive range and has a planetary gear unit, as shown in FIG. 9(b). The planetary gear unit is shown in FIG. 9(b) as including four rotating elements: a first sun gear S1, a second sun gear S2, a carrier CR rotatably supporting a long pinion P meshing with the first sun gear S1 and a short pinion P1 meshing with the second sun gear S2, and a ring gear R1 meshing with the long pinion P. The automatic speed change gear mechanism is further provided with engaging elements including a first clutch C1 that engages for the first gear speed, third gear speed and the reverse drive, a second clutch C2 that engages for the second to fourth gear speeds, a first brake B1 that engages for the fourth gear speed, a second brake B2 that engages for the first gear speed and the second gear speed, and a third brake B3 that engages for the rear drive.

The first sun gear S1 is selectively connectable to input shaft 2 by the first clutch C1, and selectively fixed to the case 15 by the first brake B1. The ring gear R1 is connected to a counter drive gear 16. The carrier CR is selectively connected to the input shaft 2 by the second clutch C2, and selectively fixed to the case 15 by the third brake B3. The second sun gear S2 is selectively fixed to the case 15 by the second brake B2.

The first brake B1 is disposed forward of the counter drive gear 16, and a parking gear 22 is disposed between the counter drive gear 16 and the first brake B1. The first and second clutches C1, C2 and the second and third brakes B2, B3 are disposed rearward of the counter drive gear 16. In this gear train, the first brake B1 is the engaging element most appropriately disposed forward of the counter drive gear 16. The second brake B2 and the third brake B3 are formed with a double piston construction. Therefore, this embodiment also provides suitable compactness.

FIG. 10(b) shows an automatic speed change gear mechanism for establishing at least a drive range and a reverse range designed to achieve five gear speeds in the drive range.

The automatic speed change gear mechanism of this fifth embodiment has a planetary gear unit which, as shown in FIG. 10(b), includes five rotating elements: a first sun gear S1; a second ring gear R2; a carrier CR rotatably supporting a first short pinion P1 meshing with the first sun gear S1, a second short pinion P2 meshing with the second ring gear R2, and a long pinion P meshing with the first and second short pinions P1, P2; a first ring gear R1 meshing with the long pinion P; and a second sun gear S2 meshing with the long pinion P. The automatic speed change gear mechanism is further provided with engaging elements which, as shown in FIG. 10(a), includes a first clutch C1 that engages for the first to third gear speeds, a second clutch C2 that engages for the third to fifth gear speeds, a third clutch C3 that engages for the reverse drive, a first brake B1 that engages for the second gear speed and the fourth gear speed, a second brake B2 that engages for first gear speed, fifth gear speed and reverse.

The first sun gear S1 is selectively connected to an input shaft 2, that is, the first shaft, by the first clutch C1. The first ring gear R1 is connected to counter drive gear 16. The carrier CR is connectable to the input shaft 2 by the second clutch C2. The second sun gear S2 is connectable to the input shaft 2 by the third clutch C3, and selectively fixed to the case 15 by the first brake B1. The second ring gear R2 is selectively fixed to the case 15 by the second brake B2.

The second clutch C2 is disposed forward of the counter drive gear 16, and a parking gear 22 is disposed between the counter drive gear 16 and the second clutch C2. The first and third clutches C1, C3 and the first and second brakes BE, B2 are disposed rearward of the counter drive gear 16. In this gear train, the second clutch C2 is the engaging element most appropriately disposed forward of the counter drive gear 16. The first clutch C1 and the third clutch C3 are formed in a double piston construction which, as in the previously described embodiments, provides further compactness.

The automatic speed change gear mechanism has a planetary gear unit, as shown in FIG. 10(c), which includes five rotating elements: a first sun gear S1; a carrier CR rotatably supporting a short pinion P1 meshing with the first sun gear S1 and a long pinion P meshing with the short pinion P1; a first ring gear R1 meshing with the short pinion P1; a second sun gear S2 meshing with the long pinion P; and a second ring gear R2 meshing with the long pinion P. The automatic speed change gear mechanism further has engaging elements as shown in FIG. 10(a), that is, a first clutch C1 that engages for the first to third gear speeds, a second clutch C2 that engages for the third to fifth gear speeds, a third clutch C3 that engages for reverse, a first brake B1 that engages for the second gear speed and the fourth gear speed, a second brake B2 that engages for the first gear speed, the fifth gear speed and reverse.

The first sun gear S1 is connectable to an input shaft 2 by the third clutch C3, and is selectively fixed to the case by the first brake B1. The first ring gear R1 is connected to counter drive gear 16. The carrier CR is connectable to the input shaft 2 by the second clutch C2. The second sun gear S2 is connectable to the input shaft 2 by the first clutch C1. The second ring gear R2 is selectively fixed to the case 15 by the second brake B2.

The first brake B1 is disposed forward of the counter drive gear 16, and a parking gear 22 is disposed between the counter drive gear 16 and the first brake B1. The first to third clutches C1, C2, C3 and the second brake B2 are disposed rearward of the counter drive gear 16. In this gear train, the first brake B1 is the engaging element most appropriately disposed forward of the counter drive gear 16.

FIGS. 11 shows a portion of a sixth embodiment of the automatic speed change gear mechanism of the invention for establishing at least a drive range and a reverse range, and which is designed to achieve five gear speeds in the drive range.

Figures 11A, 11B:
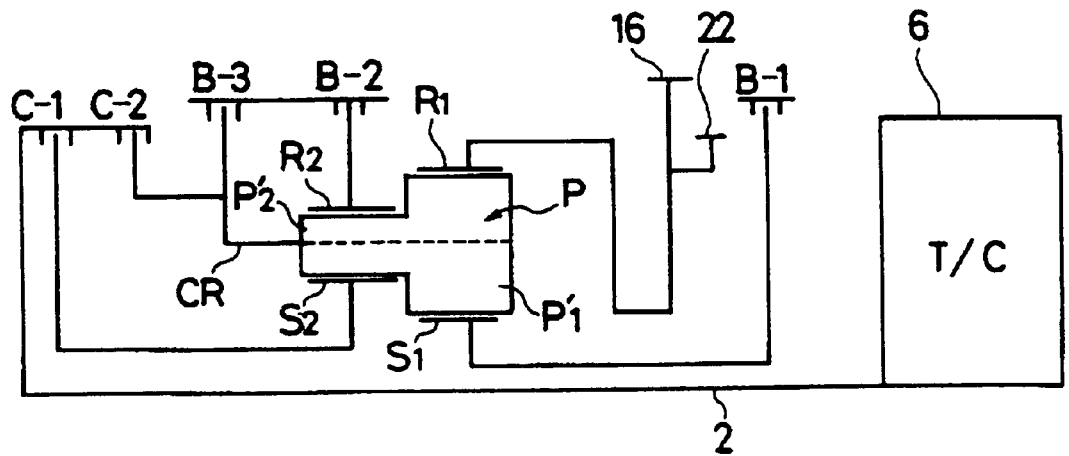
FIG. 11(a) is a table of operations of engaging elements in yet a further modification.
FIG. 11(b) is a skeletal diagram illustrating yet another example of an arrangement of the engaging elements for engagement and disengagement according to the table of FIG. 11(a)
Figure 12:
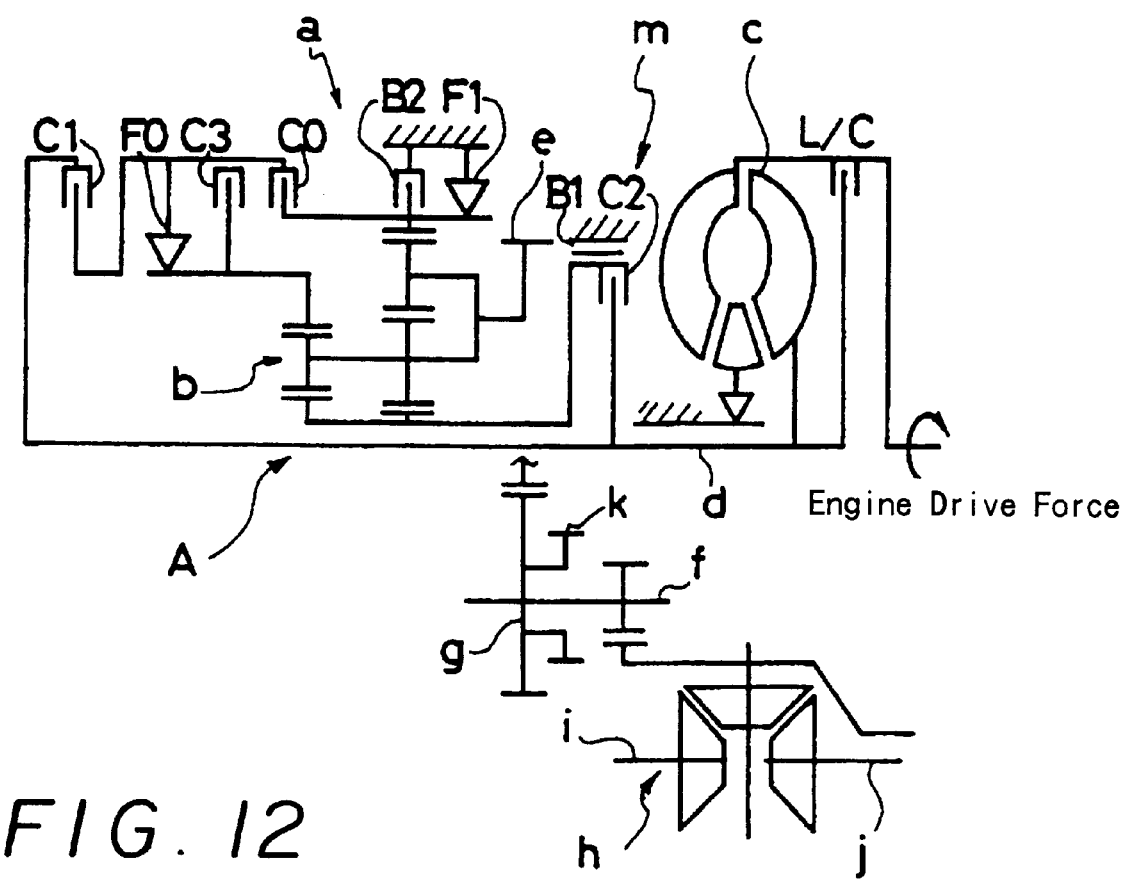
FIG. 12 is a skeletal diagram of a conventional automatic transmission.
Figure 14:
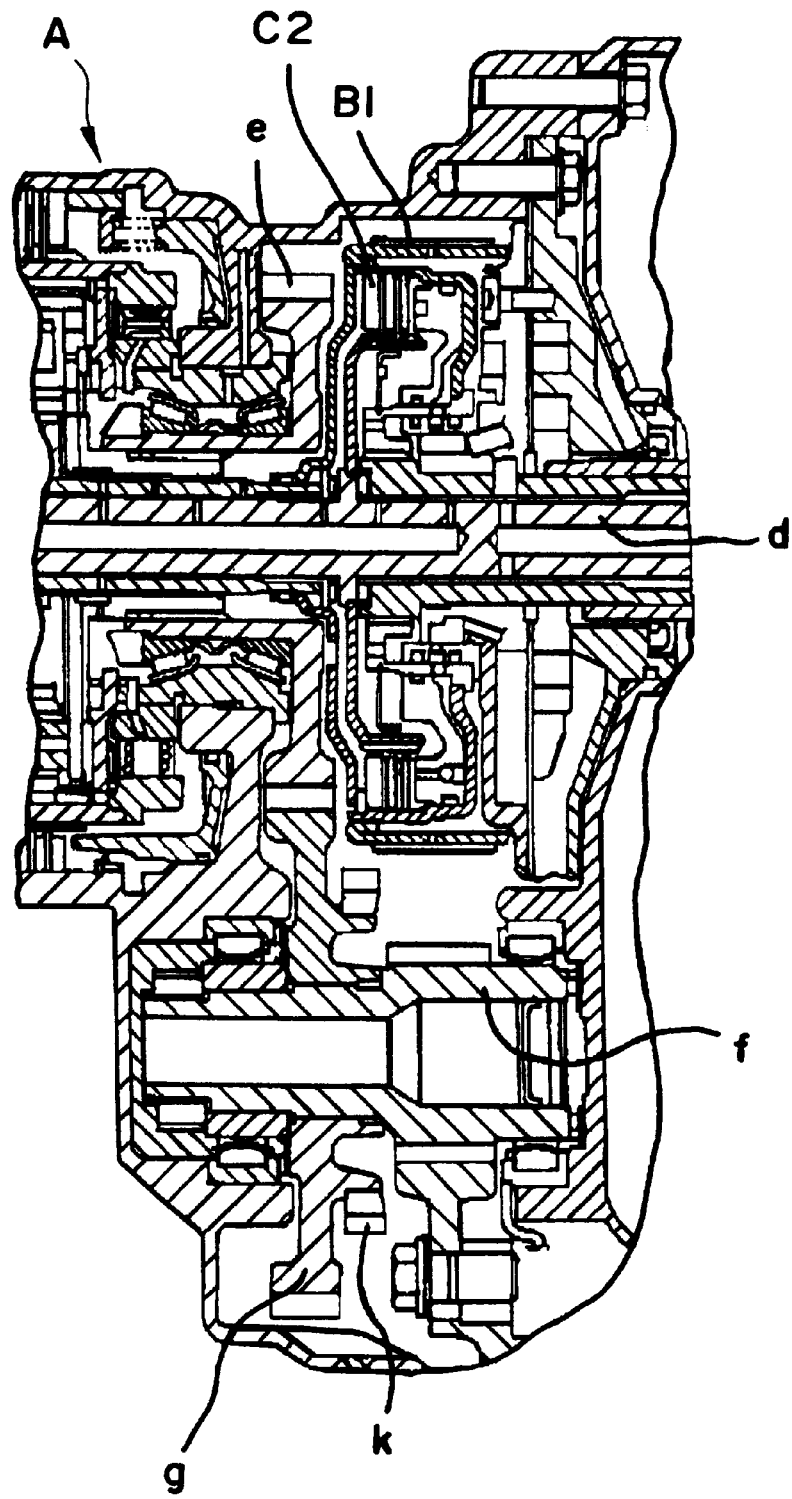
FIG. 14 is a sectional view of a portion of the conventional automatic transmission shown in FIG. 12.

The automatic speed change gear mechanism of the sixth embodiment has a planetary gear unit, as shown in FIG. 11(b), which includes five rotating elements: a carrier CR rotatably supporting a stepped long pinion P having a large-diameter first pinion portion P'1 and a small-diameter second pinion portion P'2; a first sun gear S1 meshing with the first pinion portion P'1; a first ring gear R1 meshing with the first pinion portion P'1; a second sun gear S2 meshing with the second pinion portion P'2; and a second ring gear R2 meshing with the second pinion portion P'2. The automatic speed change gear mechanism further has engaging elements which, as shown in FIG. 11(a), include: a first clutch C1 that engages for the first gear speed, the third gear speed, the fifth gear speed and reverse, a second clutch C2 that engages for the second to fourth gear speeds, a first brake B1 that engages for the fourth gear speed and the fifth gear speed, a second brake B2 that engages for the first gear speed and the second gear speed, and a third brake B3 that engages for the reverse drive.

The first sun gear S1 is selectively fixed to the case 15 by the first brake B1. The first ring gear R1 is connected to a counter drive gear 16. The carrier CR is connectable to the input shaft 2 by the second clutch C2, and selectively fixed to the case by the third brake B3. The second sun gear S2 is connectable to the input shaft 2 by the first clutch C1. The second ring gear R2 is selectively fixed to the case 15 by the second brake B2.

The first brake B1 is disposed forward of the counter drive gear 16, and a parking gear 22 is disposed between the counter drive gear 16 and the first brake B1. The first and second clutches C1, C2 and the second and third brakes B2, B3 are disposed rearward of the counter drive gear 16. In this gear train of the sixth embodiment, the first brake B1 is the engagement element most appropriately disposed forward of the counter drive gear 16. The second brake B2 and the third brake B3 are formed in a double piston construction and, therefore, this embodiment is also suitable for a compact construction.

The present invention is not limited to the above-described gear trains, but may be applied to any gear train as long as the gear train allows for a comparable arrangement of a relatively small-capacity engaging element that is in a disengaged state in the first gear speed or in reverse drive.

In the foregoing embodiments and modifications, the parking gear 22 is provided integrally with the counter drive gear 16 or the counter driven gear 17. However, the connecting structure between the parking gear 22 and the counter drive gear 16 or the counter driven gear 17 is not particularly limited, as long as the parking gear 22 is disposed in a space δ between the counter drive gear 16 or the counter driven gear 17 and the second clutch C2 or the first brake B1, and prevents rotation of the counter drive gear 16 or the counter driven gear 17 when the transmission is set in park.

While the present invention has been described with reference to what are presently considered to be preferred embodiments thereof, it is to be understood that the invention is not limited to the disclosed embodiments or modifications. On the contrary, the invention is regarded as including various modifications and equivalent arrangements within the spirit and/or scope of the appended claims.

What is claimed is:

1. An automatic transmission comprising:

a case;

a first shaft for receiving drive force input from an engine defining an engine side of said automatic transmission;

an automatic speed change gear mechanism which includes a planetary gear unit having a plurality of rotary elements which are rotated responsive to rotation of said first shaft and which further includes a plurality of engaging elements for controlling rotation of the plurality of rotary elements, the automatic speed change gear mechanism changing the speed of rotation of said first shaft by selective engagement of said engaging elements to set one of plural gear speeds, and then outputting the set gear speed;

an output member mounted substantially centrally of the first shaft for outputting the set speed;

a second shaft carrying a driven member to which the output from the output member is transmitted;

a parking gear mounted on one of said first and second shafts;

a third shaft connected to a differential device to which the output from the output member is transmitted from the second shaft, wherein at least one of said engaging elements is disengaged in first gear speed or in reverse and said one engaging element is located on the engine side of the output member, and the other engaging elements of said plurality of engaging elements are disposed on the side of the output member opposite the engine side, and wherein said parking gear is positioned axially between said output member and said one engaging element.

2. An automatic transmission according to claim 1, wherein said parking gear has a diameter smaller than that of the output member and that of said one engaging element.

3. An automatic transmission according to claim 1, wherein said planetary gear unit comprises:

a first sun gear;

a carrier rotatably supporting a short pinion meshing with said first sun gear and a long pinion meshing with said short pinion;

a ring gear meshing with said long pinion and connected to said output member; and a second sun gear meshing with said long pinion; and wherein said engaging elements comprise:

a first clutch for selectively connecting said first sun gear to said first shaft;

a second clutch, serving as said one engaging element, for selectively connecting said carrier to said first shaft;

first fixed engagement means for fixing said carrier to said case;

a third clutch for selectively connecting said second sun gear to said first shaft; and second fixed engagement means for fixing said second sun gear to said case.

4. An automatic transmission according to claim 3, wherein said first fixed engagement means comprises a first one-way clutch enabling said carrier to fixedly engage with said case during rotation in one direction, and a first brake, which is disposed substantially in parallel to said first one-way clutch, for fixedly engaging said carrier with said case; and wherein said second fixed engagement means comprises a second brake for fixedly engaging said second sun gear with said case, a second one-way clutch enabling said second sun gear to fixedly engage with said case during rotation in one direction, and a third brake disposed substantially in series with said second one-way clutch.

5. An automatic transmission according to claim 4, further comprising:

first, second and third hydraulic servos for operating, respectively, said first, second and third clutches, said first and third hydraulic servos being located on the side of said output member opposite said engine side and including pistons arranged in a double piston construction in which one piston is slidably mounted in the other piston.

6. An automatic transmission according to claim 3, further comprising:

first, second and third hydraulic servos for operating, respectively, said first, second and third clutches, said first and third hydraulic servos being located on the side of said output member opposite said engine side and including pistons arranged in a double piston construction in which one piston is slidably mounted in the other piston.

7. An automatic transmission according to claim 1, wherein said the planetary gear unit comprises:

a first sun gear;

a carrier connected to said output member and rotatably supporting a short pinion meshing with said first sun gear and a long pinion meshing with said short pinion;

a ring gear meshing with said long pinion; and a second sun gear meshing with the long pinion;

a first clutch for connecting said first sun gear to the first shaft;

a brake for fixing said first sun gear with said case, said brake serving as said one engaging element;

a second clutch for connecting said ring gear to said first shaft;

fixed engagement means for fixing said ring gear to said case; and a third clutch for connecting said second sun gear to said first shaft.

8. An automatic transmission according to claim 1, wherein said planetary gear unit comprises:
- a first sun gear;
- a long pinion meshing with the first sun gear;
- a ring gear meshing with the long pinion and connected to said output member;
- a second sun gear; and
- a carrier rotatably supporting a short pinion meshing with the second sun gear and the long pinion meshing with the short pinion,
- a first clutch for connecting said first sun gear to said first shaft;
- a first brake for fixedly engaging said first sun gear with said case, said first brake serving as said one engaging element;
- a second clutch for connecting said carrier to said first shaft;
- a second brake for fixedly engaging said carrier with said case; and
- a third brake for fixedly engaging said second sun gear with said case.

9. An automatic transmission according to claim 8 further comprising:
- first, second and third hydraulic servos for operating, respectively, said first, second and third brakes, said second and third hydraulic servos being located on the side of the output member opposite the engine side and including pistons arranged in a double piston construction in which one of the pistons is slidably mounted in the other piston.

10. An automatic transmission according to claim 1, wherein said planetary gear unit comprises:
- a first sun gear;
- a first short pinion meshing with the first sun gear and connected to said output member;
- a long pinion meshing with the first short pinion;
- a first ring gear meshing with the long pinion;
- a second sun gear meshing with the long pinion;
- a second short pinion meshing with the long pinion;
- a second ring gear meshing with the second short pinion; and
- a carrier rotatably supporting the first short pinion, the second short pinion and the long pinion,
- a first clutch for connecting said first sun gear to said first shaft;
- a second clutch for connecting said carrier to said first shaft, said second clutch serving as said one engaging element;
- a third clutch for connecting said second sun gear to said first shaft;
- first fixed engagement element means for fixedly engaging said second sun gear with said case; and
- second fixed engagement means for fixedly engaging said second ring gear with said case.

11. An automatic transmission according to claim 10, further comprising:
- first, second and third hydraulic servos for operating, respectively, said first, second and third clutches, said first and third hydraulic servos being located on the side of said output member opposite said engine side and including pistons arranged in a double piston construction in which one piston is slidably mounted in the other piston.

12. An automatic transmission according to claim 1, wherein said planetary gear unit comprises:
- a first sun gear;
- a short pinion meshing with said first sun gear;
- a long pinion meshing with said short pinion;
- a first ring gear meshing with said short pinion and connected to said output member;
- a second sun gear meshing with said long pinion;
- a second ring gear meshing with said long pinion; and
- a carrier rotatably supporting said short pinion and said long pinion,
- a first clutch for connecting said first sun gear to said first shaft;
- a brake for fixedly engaging said first sun gear with said case, said brake serving as said one engaging element;
- a second clutch for connecting said carrier to said first shaft;
- a third clutch for connecting said second sun gear to the first shaft; and
- fixed engagement means for fixing said second ring gear to said case.

13. An automatic transmission according to claim 1, wherein said planetary gear unit comprises:
- a stepped pinion having a first pinion portion and a second pinion portion which have different diameters;
- a carrier rotatably supporting the stepped pinion;
- a first sun gear and a first ring gear which mesh with the first pinion portion, said first ring gear being connected to said output member; and
- a second sun gear and a second ring gear which mesh with the second pinion portion,
- a first brake for fixing said first sun gear to said case, said first brake serving as said one engaging element;
- a first clutch for connecting said carrier to said first shaft;
- a second brake for fixing said carrier to said case;
- a second clutch for connecting said second sun gear to said first shaft; and
- a third brake for fixing said second ring gear to said case.

14. An automatic transmission according to claim 13 further comprising:
- first, second and third hydraulic servos for operating, respectively, said first, second and third brakes, said second and third hydraulic servos being located on the side of the output member opposite the engine side and including pistons arranged in a double piston construction in which one of the pistons is slidably mounted in the other piston.

15. An automatic transmission according to claim 1 wherein said parking gear axially overlaps a hub of said one engaging element.

16. An automatic transmission comprising:
- a case;
- a first shaft for receiving drive force input from an engine defining an engine side of said automatic transmission;
- an automatic speed change gear mechanism which includes a planetary gear unit having a plurality of rotary elements which are rotated responsive to rotation of said first shaft and which further includes a plurality of engaging elements for controlling rotation of the plurality of rotary elements, the automatic speed change gear mechanism changing the speed of rotation of said first shaft by selective engagement of said engaging elements to set one of plural gear speeds, and then outputting the set gear speed;

an output member mounted substantially centrally of the first shaft for outputting the set speed;

a second shaft carrying a driven member to which the output from the output member is transmitted;

a parking gear integral with said output member;

a third shaft connected to a differential device to which the output from the output member is transmitted from the second shaft, wherein at least one of said engaging elements is disengaged in first gear speed or in reverse and said one engaging element is located on the engine side of the output member, and the other engaging elements of said plurality of engaging elements are disposed on the side of the output member opposite the engine side;

a hydraulic servo, for operating said one engaging element, which includes a piston having a boss portion extending toward the output member; and a supply opening for supplying operating oil to said hydraulic servo formed in a portion of said first shaft located between said output member and said one engaging element, said supply opening being located adjacent to a portion of said first shaft which slidably supports said boss portion in liquid-tight manner; and wherein said parking gear is positioned axially between said output member and said one engaging element.

17. An automatic transmission comprising:

a case;

a first shaft for receiving drive force input from an engine defining an engine side of said automatic transmission;

an automatic speed change gear mechanism which includes a planetary gear unit having a plurality of rotary elements which are rotated responsive to rotation of said first shaft and which further includes a plurality of engaging elements for controlling rotation of the plurality of rotary elements, the automatic speed change gear mechanism changing the speed of rotation of said first shaft by selective engagement of said engaging elements to set one of plural gear speeds, and then outputting the set gear speed;

an output member mounted substantially centrally of the first shaft for outputting the set speed;

a second shaft carrying a driven member to which the output from the output member is transmitted;

a parking gear integral with said driven member;

a third shaft connected to a differential device to which the output from the output member is transmitted from the second shaft, wherein at least one of said engaging elements is disengaged in first gear speed or in reverse and said one engaging element is located on the engine side of the output member, and the other engaging elements of said plurality of engaging elements are disposed on the side of the output member opposite the engine side;

a hydraulic servo, for operating said one engaging element, which includes a piston having a boss portion extending toward the output member; and a supply opening for supplying operating oil to said the hydraulic servo formed in a portion of said first shaft located between said output member and said one engaging element, said supply opening being located adjacent to a portion of said first shaft which slidably supports said boss portion in liquid-tight manner; and wherein said parking gear is positioned axially between said output member and said one engaging element.

* * * * *

UNITED STATES PATENT AND TRADEMARK OFFICE
CERTIFICATE OF CORRECTION

PATENT NO.    : 5,951,433
DATED         : September 14, 1999
INVENTOR(S)   : Tsukamoto et al.

It is certified that error appears in the above-identified patent and that said Letters Patent is hereby corrected as shown below:

Specification:
Column 12,
Line 11, the number "6" should be replaced with the Greek symbol -- $\delta$ --;
Line 25, "$\beta$" should read as -- $\beta'$ --.

Column 13,
Lines 31 and 33, the number 34 should be omitted.

Column 15,
Lines 12, 14, 22, 24 and 32, the phrase "shaft a" should read as -- shaft $\alpha$ --.

Column 17,
Line 55, "BE" should read as -- B1 --.

Column 24,
Line 25, (indicated as line 27), "operating oil said the" should read -- operating oil said --.

Signed and Sealed this

Twenty-first Day of August, 2001

Attest:

NICHOLAS P. GODICI
*Attesting Officer*    *Acting Director of the United States Patent and Trademark Office*